(12) United States Patent
Hughston

(10) Patent No.: US 9,249,722 B2
(45) Date of Patent: *Feb. 2, 2016

(54) PERFORMANCE OF A ROTARY ENGINE

(76) Inventor: Boots Rolf Hughston, Mill Valley, CA (US)

(*) Notice: Subject to any disclaimer, the term of this patent is extended or adjusted under 35 U.S.C. 154(b) by 883 days.

This patent is subject to a terminal disclaimer.

(21) Appl. No.: 13/428,131

(22) Filed: Mar. 23, 2012

(65) Prior Publication Data

US 2012/0174890 A1    Jul. 12, 2012

(51) Int. Cl.
*F02B 53/00* (2006.01)
*F02B 53/04* (2006.01)

(52) U.S. Cl.
CPC . *F02B 53/04* (2013.01); *Y02T 10/17* (2013.01)

(58) Field of Classification Search
CPC ........ F01C 1/36; F01C 19/025; F01C 19/085; F02B 43/12; F02B 55/02; F02B 55/08; F02B 53/02; F02B 53/10; F02B 53/12; Y02T 10/17; Y02T 10/32
USPC ....... 123/241, 245, 43 R, 242, 200, 205, 210; 418/225, 227
See application file for complete search history.

(56) References Cited

U.S. PATENT DOCUMENTS

| | | | | |
|---|---|---|---|---|
| 3,604,277 | A | * | 9/1971 | Stripling et al. ............... 74/5.12 |
| 3,847,514 | A | * | 11/1974 | Chen et al. ...................... 418/15 |
| 3,865,522 | A | | 2/1975 | Nardi |
| 4,221,553 | A | * | 9/1980 | Miles ............................ 418/61.1 |
| 4,481,920 | A | * | 11/1984 | Carr et al. ...................... 123/246 |
| 4,819,594 | A | * | 4/1989 | Tsakiroglou .................. 123/201 |
| 5,039,290 | A | * | 8/1991 | Nardi ............................. 418/227 |
| 6,729,296 | B2 | | 5/2004 | King |
| 6,776,135 | B1 | | 8/2004 | Chen et al. |
| 6,883,488 | B2 | | 4/2005 | Viitamaki |
| 6,988,441 | B2 | | 1/2006 | Harcourt et al. |
| 7,143,737 | B2 | | 12/2006 | Kim |
| 7,255,086 | B2 | | 8/2007 | Kovalenko |
| 7,350,501 | B2 | | 4/2008 | Watkins et al. |
| 7,793,635 | B2 | | 9/2010 | Okamura |
| 7,836,697 | B2 | | 11/2010 | Holden et al. |
| 7,845,332 | B2 | | 12/2010 | Wang |
| 7,987,823 | B2 | | 8/2011 | Wiens |
| 8,001,949 | B2 | | 8/2011 | Savvakis |
| 8,011,346 | B2 | | 9/2011 | Blount |

* cited by examiner

*Primary Examiner* — Jesse Bogue
*Assistant Examiner* — Thomas Olszewski

(57) ABSTRACT

The present invention relates to a system for improving the performance of a rotary engine comprising at least one of a piston having at least one piston vane configured to rotate. A peddle block is positioned in the pathway of the piston vane, wherein as the piston vane approaches the peddle block a secondary exhaust pressure increases against the piston vane surface, the secondary exhaust pressure, in part, causes the piston vane to rotate and self-align for a subsequent cycle. A variable orifice secondary exhaust port selectively vents at least a portion of the secondary exhaust pressure, away from the piston vane setting an optimal rotational speed of the piston vane, improving performance of the rotary engine. Other exemplary embodiments include turbo-charging the rotary engine by increasing the secondary exhaust pressure, increasing the piston vane rotation, and increasing the amount of secondary exhaust pressure that is recirculated.

20 Claims, 16 Drawing Sheets

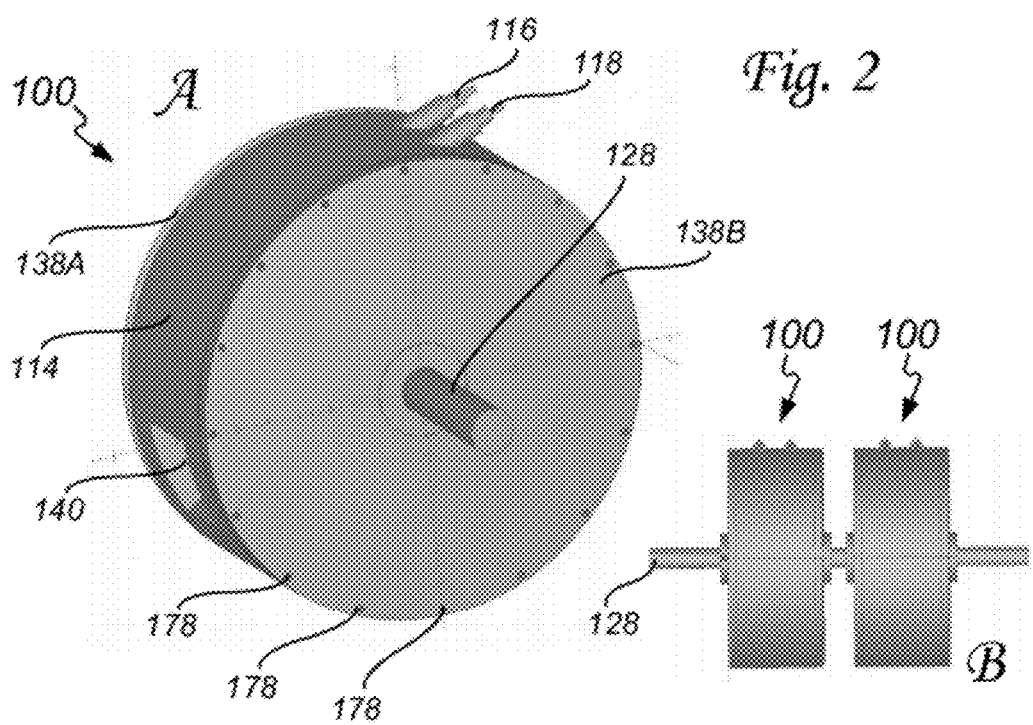
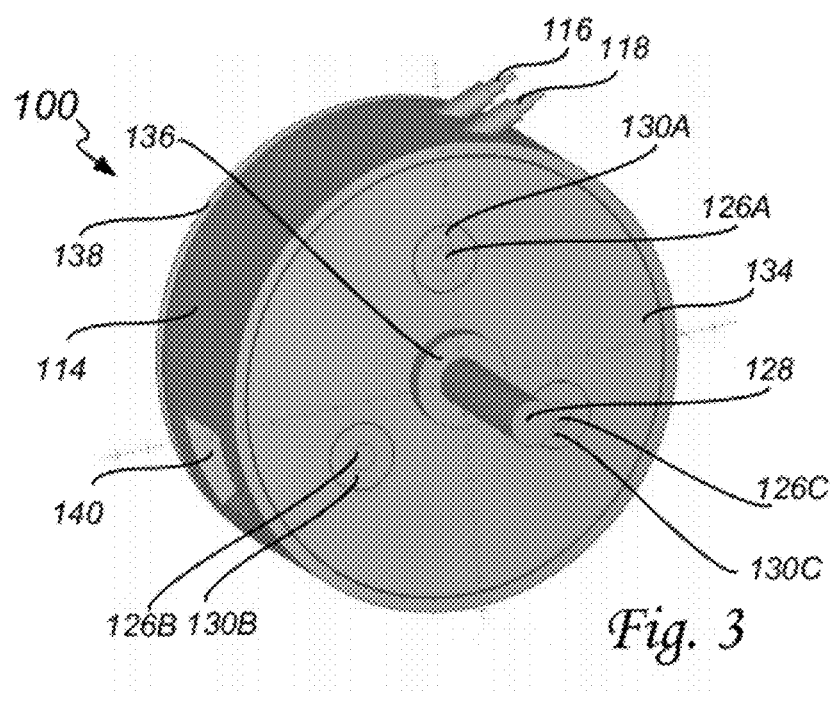
Fig. 2
Fig. 3

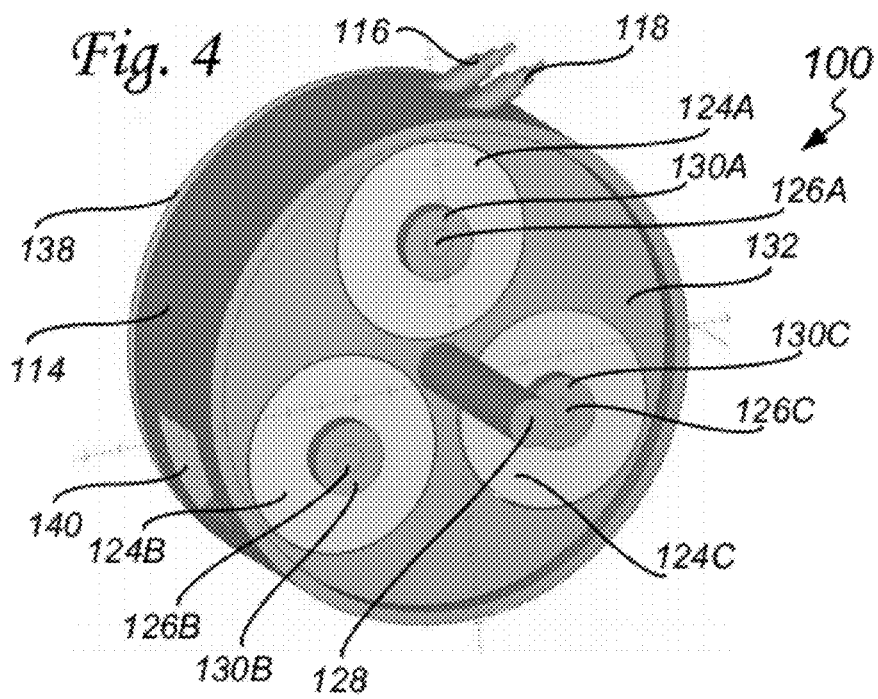
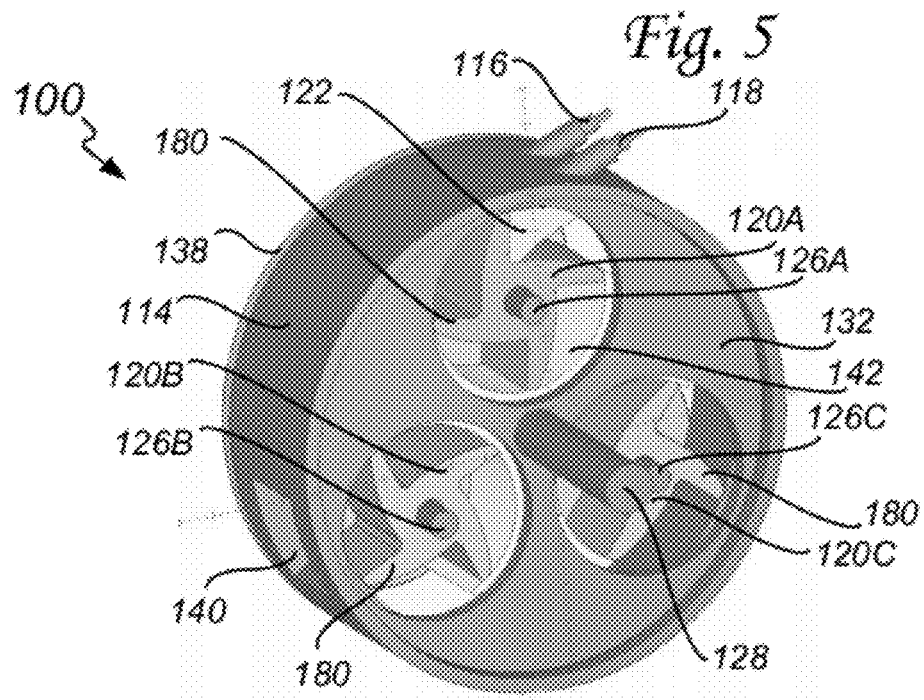

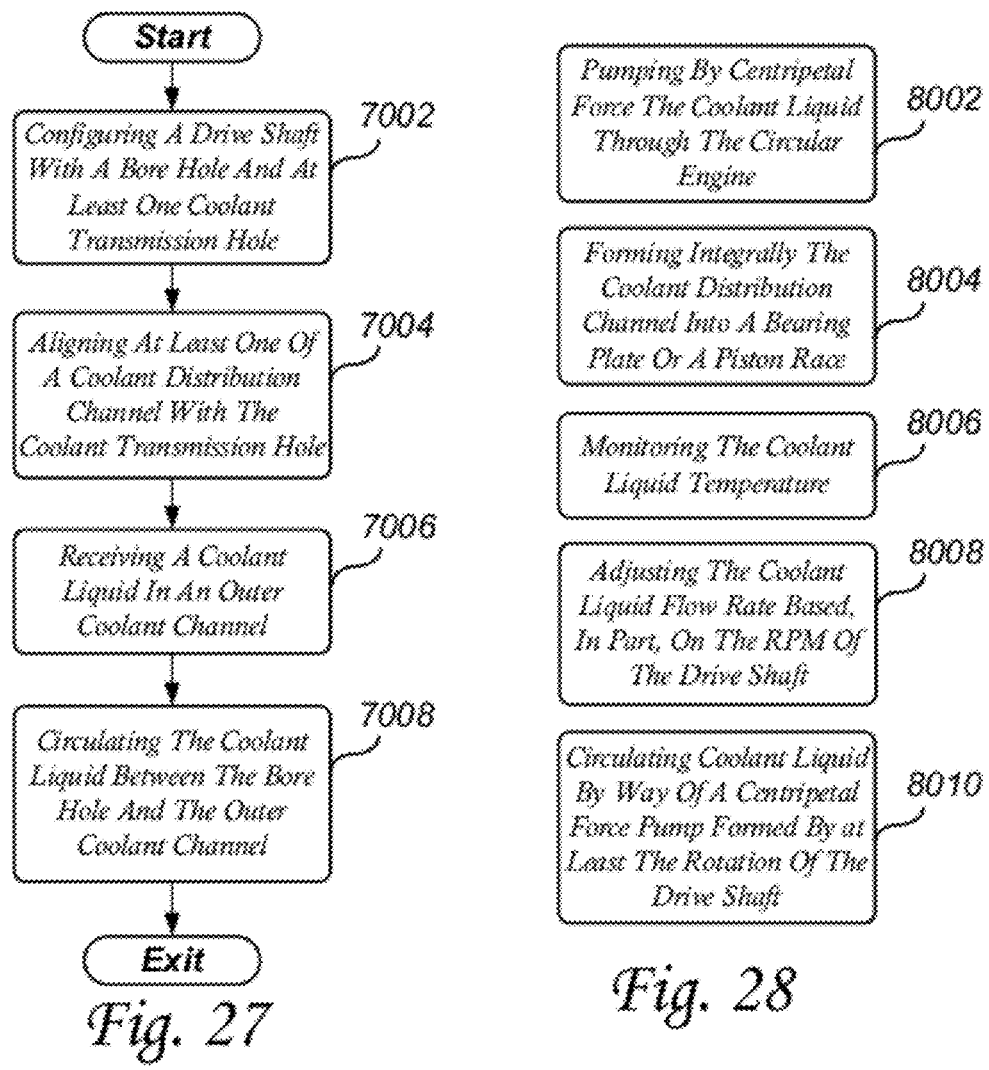

PERFORMANCE OF A ROTARY ENGINE

TECHNICAL FIELD OF THE INVENTION

This invention relates to a system and method for improving the performance of a rotary engine and in particular to a system comprising at least one of a piston having at least one piston vane configured to rotate. At least one of a peddle block is positioned in the pathway of the piston vane, wherein as the piston vane approaches the peddle block a secondary exhaust pressure increases against the piston vane surface, the secondary exhaust pressure, in part, causes the piston vane to rotate and self-align for a subsequent cycle. A variable orifice secondary exhaust port selectively vents at least a portion of the secondary exhaust pressure, away from the piston vane setting an optimal rotational speed of the piston vane, improving performance of the rotary engine.

BACKGROUND OF THE INVENTION

Before our invention internal combustion engines have often been four stroke piston driven types of engines with an intake, compression, power, and exhaust stroke. It is not uncommon that these types of engines might only be 25% efficient, in part, because of the three strokes (intake, compression, and exhaust) that do not produce power. Furthermore, it is not uncommon to find that inefficient four stroke engine designs might be less than 12% efficient.

A shortcoming of four stroke engines can be that they require gasoline or alcohol derivatives to minimize knocking and pre-ignition. They can also exhibit weighs of hundreds of pounds and have limited revolutions per minute (RPM) ranges. A poorly performing four stroke engine can be an inherent polluter of carbon dioxide and or carbon monoxide and they can be very sensitive, demanding highly refined fuels. They also can have hundreds of moving parts and need expensive tooling to manufacture and produce.

Even the rotary Winkle engine can exhibit these shortcomings. In this regard, the Winkle engine utilizes four strokes (four Phases) and can exhibit low efficiency. In addition, the rotary Winkle engine and other rotary engines can exhibit substantial vibrations caused by the pistons traveling in an elliptical oblong orbit. Other shortcomings of rotary style engines can be the need for a planetary gear set to track and align the pistons.

There is a need for an engine that can operate with a single power stroke, effectively operating with all motion moving in one forward direction, thereby increasing the efficiency of the engine by the elimination of inefficient strokes.

There is also a need for an engine that does not require higher octane fuels to prevent knocking or pre-ignition. In this regard, it is desirable to have an engine that can run on many types and kinds of fuels including gasoline, alcohol, hydrogen, ethanol and others.

There is also a need for a light weight engine whose weight to power ratio is extremely low. In this regard, it is desirable that a new light weight engine's power output be comparable to the amount of power output by a multi-cylinder engine weighing hundreds of pounds more.

There is also a need for an engine that is not limited to a maximum RPM range. Instead, with minimal moving parts, low vibration, and self aligning-pistons there is a need for an engine that can reduce the number of strokes and eliminate complex moving parts such as push-rods, camshafts, crankshafts, and others, thereby improving engine reliability and increasing the maximum engine RPM capability.

There is a long felt need for an engine that can meet these needs and overcome these shortcomings and limitations, as well as meet other needs and overcome other shortcomings and limitations, that gives rise to the present invention.

SUMMARY OF THE INVENTION

The shortcomings of the prior art are overcome and additional advantages are provided through the provision of a system for improving the performance of a rotary engine, the system comprising at least one of a piston having at least one piston vane configured to rotate. At least one of a peddle block is positioned in the pathway of the piston vane, wherein as the piston vane approaches the peddle block a secondary exhaust pressure increases against the piston vane surface, the secondary exhaust pressure, in part, causes the piston vane to rotate and self-align for a subsequent cycle. A variable orifice secondary exhaust port selectively vents at least a portion of the secondary exhaust pressure, away from the piston vane setting an optimal rotational speed of the piston vane, improving performance of the rotary engine.

Additional shortcomings of the prior art are overcome and additional advantages are provided through the provision of a method of improving the performance of a rotary engine, the method comprising changing the RPM of the rotary engine. An optimal rotational speed of a piston vane is determined to minimize over and under rotation and allow the piston vane to rotate around a peddle block and at least a portion of a secondary exhaust pressure between the piston vane and the peddle block is positioned in the pathway of the piston vane is vented to set the optimal rotational speed of the piston vane.

Additional shortcomings of the prior art are overcome and additional advantages are provided through the provision of a method for improving the performance of a rotary engine, the method comprising increasing a primary exhaust pressure by reduction of aperture size of at least one of a variable orifice primary exhaust port. A secondary exhaust pressure between a piston vane and a peddle block is positioned in the pathway of the piston vane is adjusted by changing aperture size of at least one of a variable orifice secondary exhaust port. The remaining portion of the secondary exhaust pressure is then recirculated, as the piston vane rotates around the peddle block, wherein the rotary engine RPM increases.

The mechanical and electrical systems and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2-9 illustrate detailed view examples of a rotary engine;

FIGS. 27-28 illustrate examples of a method of cooling a rotary engine.

Figure 1:
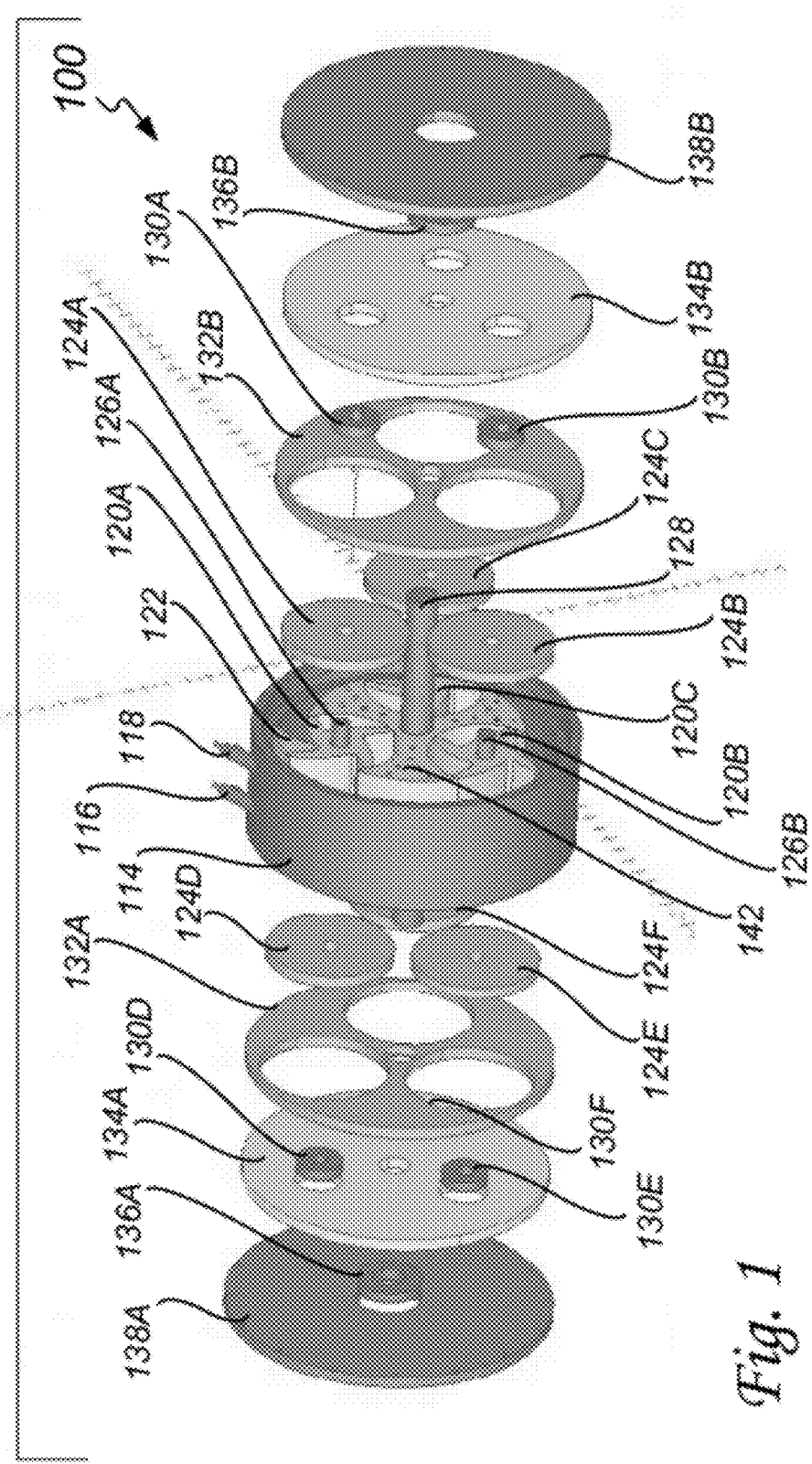
FIG. 1 illustrates one example of an exploded view of a rotary engine.

The detailed description explains the preferred embodiments of the invention, together with advantages and features, by way of example with reference to the Figures.

REFERENCE NUMERALS IN THE FIGURES 100 rotary engine
102 Bearing flange
104 Coolant fluid bore hole
106 Coolant fluid channel
108 Inner case wall
110 Variable orifice primary exhaust port
112 Threaded actuator holding bracket
114 Outer case
116 Inlet port
118 Ignition source
120 Piston
122 Peddle block
124 Piston end cap
126 Piston shaft
128 Drive shaft
130 Unidirectional bearing
132 Piston race
134 Bearing plate
136 Drive shaft bearing
138 Lid
140 Primary exhaust port
142 Piston block
144 Fuel means
146 Spark means
148 Engine monitoring means
150 Engine controller
152 Hydrogen fuel source system
154 Electrolyzer means
156 Aqueous solution
158 Thrust creation means
160 Operational control means
162 Exhaust port control means
164 Cooling system means
166 Fuel combining means
168 Variable orifice secondary exhaust port
170 Piston block fastener hole
172 Coolant connector
174 Coolant transmission hole
176 Coolant distribution channel
178 Fastener
180 Piston vane
182 Threaded actuator
184 Piston vane force side
186 Piston vane rotational side

DETAILED DESCRIPTION OF THE INVENTION

Use of the term 'revolution per minute' or 'RPM', or 'cycles per minute', in the present invention, is a unit of frequency of rotation. In this regard, it can be the number of revolutions the rotary engine 100 components make in the unit of measure of a minute. For example and not a limitation, a drive shaft RPM refers to the number of revolutions the drive shaft make in a minute, the RPM of the piston refers to the number of revolutions the piston makes in a minute. Such can apply to other aspects of the rotary engine 100 of the present invention.

Use of the term 'engine control system' or 'engine control unit', or 'engine controller', in the present invention, is intended to include a type and or kind of electronic control that controls a series of actuators and other controls on the rotary engine 100 to ensure the engine's optimum running. It does this by reading values from a multitude of sensors associated with the rotary engine 100, interpreting the data, and adjusting the rotary engine 100 actuators accordingly.

Use of the term 'rotational dynamics', in the present invention, is intended to include the kinematic and rotational motion of objects including the position, velocity, acceleration, displacement, and other effects and forces that motion exhibits on these objects. Such forces can include, for example and not a limitation, torque, angular displacement, angular speed, angular velocity, angular acceleration, angular momentum, inertia, force, centripetal force, kinetic energy, kinematic measurements and understanding, and other aspects of rotational dynamics, as may be required and or desired to design, develop, operate, and or understand a particular embodiment.

Use of the term 'engine performance', in the present invention, is intended to include the relationship between power output, revolutions per minute (RPM), fuel or fluid consumption and ambient conditions in which the rotary engine 100 operates.

Use of the term 'engine efficiency', in the present invention, is intended to include the relationship between the total energy contained in the fuel, and the amount of energy used to perform useful work.

Turning now to the Figures in greater detail, it will be seen that in FIG. 1 there is illustrated one example of an exploded view of a rotary engine. In an exemplary embodiment rotary engine 100 can comprise an outer housing 114. The outer housing 114 can further comprise an inlet port 116 and an ignition source 118. An ignition source 118 can be a spark plug, a laser, or other types and kinds of ignition sources 118, as may be required and or desired by a particular embodiment.

Assembled into the outer housing 114 can be a peddle block 122 and at least one piston 120, though three pistons 120A-C are illustrated in FIG. 1. Each of the pistons 120A-C can be operationally coupled with and configured to rotate around a piston shaft 126, illustrated in FIG. 1 as piston shafts 126A-C respectively. Piston shaft 126C is not viewable in FIG. 1 but is illustrated in at least FIG. 5. The piston shaft 126 can be integrally formed as part of the piston 120 or manufactured as a separate component and fitted into the piston 120, as may be required and or desired in a particular embodiment.

A drive shaft 128 is position through a piston block 142. The piston block 142 is coupled to a piston race 132, illustrated as piston race 132A-B and a bearing plate 134, illustrated as bearing plate 134A-B. Piston end caps 124, illustrated as 124A-F, fit over the piston shafts 126A-C and enclose both sides of the pistons 120A-C respectively. Piston race 132A-B is operationally coupled to the front and back of the rotary engine assemble. Unidirectional bearings 130, illustrated in FIG. 1 as unidirectional bearing 130A-F, are operational coupled to the pistons 120A-C. Unidirectional bearing 130C is not viewable in FIG. 1 but is viewable in at least FIG. 7. Unidirectional bearing 130F is labeled and positioned just out of view behind piston race 132A. Bearing plate 134A-B is operationally related to the unidirectional bearings 130A-F. A drive shaft bearing 136, illustrated as drive shaft bearings 136A-B is operationally related to the drive shaft 128 and a lid 138, illustrated as lid 138A-B. The entire rotary engine 100 assembly is fastened together by at least one fastener 178, not illustrated in FIG. 1 but illustrated in at least FIG. 2.

In an exemplary embodiment the rotary engine 100 components can be manufactured out of metal, plastic, ceramics, or other materials, as may be required and or desired in a particular embodiment. As an example and not a limitation, in a toy or small gadget type of application certain of the rotary engine 100 components could be fabricated out of a plastic or light weight metal. In another example and not a limitation, a motor for a vehicle type of application could have certain of the rotary engine 100 components fabricated out of high strength hardened metal and or other types and kinds of composite material, as may be required and or desired in the particular embodiment. In a plurality of examples, the rotary engine 100 components can be fabricated from a variety of suitable materials to insure the rotary engine 100 performance and durability matches the specifications, demands, and requirements of the application in which the rotary engine 100 is being utilized.

In an exemplary embodiment the unidirectional bearing 130 only allows rotation of the piston 120 and associated piston vane 180 in one direction. In this regard, at least one of a unidirectional bearing 130 is operationally coupled to the piston 120, wherein the piston is configured to allow the piston vane 180 to rotate and the unidirectional bearing 130 prevents the piston vane 180 from rotating during combustion of fuel, also referred to as a combustive force or thrust force injection.

Figure 8:
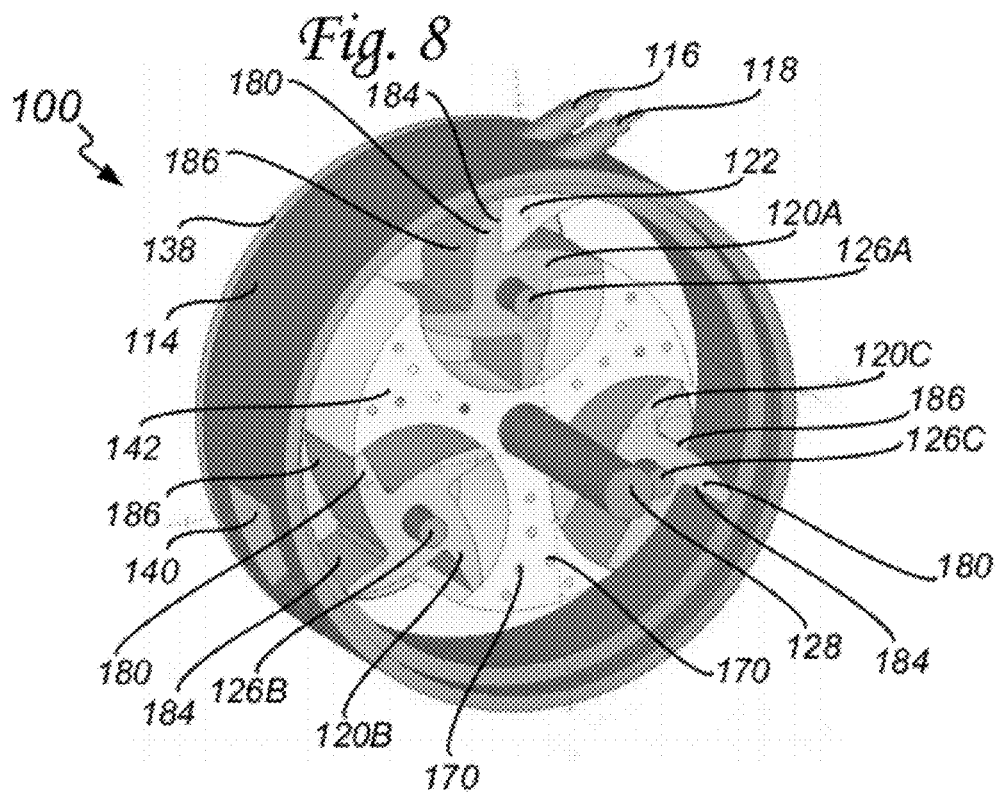

With respect to the piston vane 180, the piston vane 180 has a piston force side 184 and a piston vane 180 rotational side 186 which is not shown in FIG. 1 but is shown in at least FIG. 8. As such, the non-rotating direction of the unidirectional bearing 130 prevents the piston 120 and associated piston vane 180 from rotating when the combustion of fuel or thrust force is applied to the piston vane 180 on the piston vane force side 184. This in turn causes a power stroke, also referred to a combustive force cycle or thrust force injection cycle, to turn the drive shaft 128 causing it to rotate.

A peddle block 122 is positioned in the pathway of the piston vane 180, wherein as the piston vane 180 approaches the peddle block 122 a pressure increases against the piston vane 180 surface on the piston vane rotational side 186, the pressure, in part, causes the piston 120 to rotate, by way of the unidirectional bearing 130, rotating in the free direction and self-aligning the piston 120 and associated piston vane 180 for a subsequent cycle. For purposes of disclosure a 'cycle', as in a rotary engine 100 cycle, is defined as a series of events that are regularly repeated in the same order to produce a useful outcome, such as causing the rotary engine 100 to rotate.

Furthermore, a drive shaft 128 can be operationally related to the piston 120A-C, the piston 120A-C orbits the drive shaft 128 and as the piston vane 180 approaches the peddle block 122 the piston vane 180 rotates in the opposite rotational direction of the drive shaft 128.

Figure 20:
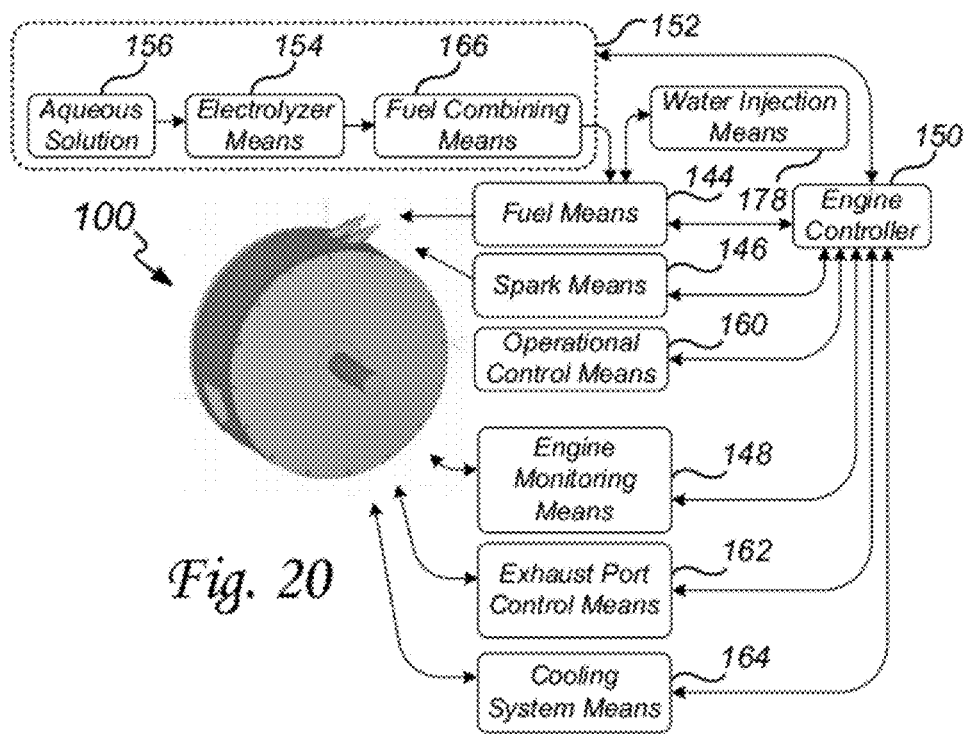

Additionally, in an exemplary embodiment, for example and not a limitation, a spark means 146, illustrated in at least FIG. 20, can be used for controlling spark generation and can be operationally connected with the ignition source 118, wherein repetitive sparks can be contained in a plasma field, which can improve engine power and efficiency.

Figure 18:
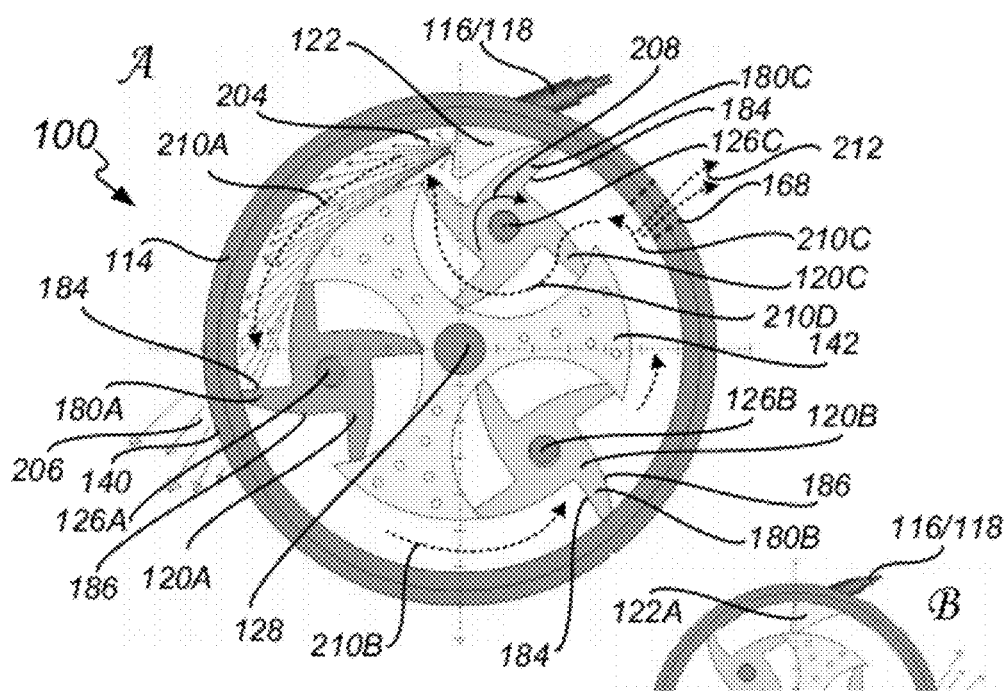
FIG. 18 illustrates one example of the primary and secondary exhaust pressure flow through the rotary engine.

In an exemplary embodiment, there can be more than one peddle block 122 can be utilized. In this regard, shown in at least view 'B' of FIG. 18 is an embodiment which utilizes two peddle blocks 122A-B and provides for multiple inlet ports 116 and ignition sources 118. An advantage of multiple peddle blocks is that firing sequences can be alternated between both peddle blocks 122A-B. In a three piston embodiment this can effectively double the power, six firings opposed to three firings per rotation. In a plurality of exemplary embodiments there can be at least one peddle block 122 up to any number of peddle blocks, as may be required and or desired in a particular embodiment.

For purposes of disclosure a 'combustive fuel' can be a fossil fuel such as gas, petroleum based gas, renewable fuel ethanol, hydrogen gas mixture, a combustive fuels source mixture with air or other types or kinds of combustive fuels or combination thereof that can be injected through an inlet port, such as inlet port 116 and ignited by an ignition source, such as ignition source 118. A 'thrust force' can be a combustive fuel source combusted external to the outer case 114 and whose force is then injected into the rotary engine 100, as a thrust force through an inlet port, such as inlet port 116. Alternatively, a thrust force can be an air pressure, other gas pressure, water pressure, or other types or kinds of thrust forces or combinations thereof that can be injected through an inlet port, such as inlet port 116, that have been pressurized external to the outer case 114 and whose force is then injected into the rotary engine 100, as a thrust force, through an inlet port, such as inlet port 116.

Referring to FIGS. 2-9 there is illustrate detailed view examples of a rotary engine 100. In an exemplary embodiment, FIG. 2 view 'A' illustrates a fully assembled rotary engine 100. Shown are outer housing 114, inlet port 116, ignition source 118, drive shaft 128, and lid 138A-B. A plurality of fasteners 178 securely hold the lid 138A-B into position keeping the rotary engine 100 components fitted, within the outer housing 114. Such fasteners 178 can be screws, rivets, and or other fasteners, as may be required and or desired in a particular embodiment. A primary exhaust 140 is also illustrated and functions to expel at least a portion of the combusted fuel or thrust force, also referred to as a primary exhaust pressure, from the rotary engine 100.

In another exemplary embodiment, FIG. 2 view 'B' illustrates how more than one rotary engine 100 can share a common drive shaft 128. An advantage, in the present invention, of more than one rotary engine 100 sharing a common drive shaft 128 is that the power out of the drive shaft is increased by the addition of multiple rotary engines 100. Any number of rotary engines 100 can share a common drive shaft 128, as may be required and or desired in a particular embodiment.

Referring to FIG. 3 the lid 138 has been removed exposing the unidirectional bearings 130A-C, the piston shafts 126A-C, the drive shaft bearing 136, the bearing plate 134, and other rotary engine 100 components.

For purposes of disclosure, in operation, the drive shaft bearing 136 is a mechanical device to allow constrained relative motion between the drive shaft 128 and other rotary engine 100 components. Furthermore, the unidirectional bearing 130 is a mechanical device to allow constrained relative motion of the piston 120 and associated piston vane 180 by way of the piston shaft 126. In this regard, the unidirectional bearing 130 only allows rotational movement in one direction, which allows the piston vane 180 to remain rigidly fixed during combustion or thrust force injection and rotate freely as the piston vane 180 approaches the peddle block 122 to allow the piston 120 to avoid hitting the peddle block 122 and to rotate into position for the next cycle of the rotary engine 100.

Referring to FIG. 4 the piston race 132 has been removed exposing the piston end caps 124A-C, and other rotary engine 100 components. Each of the pistons 120A-C is enclosed on both sides with a piston end cap 124. The piston end caps 124A-C and corresponding piston end caps on the back side of the piston 120A-C, not shown in FIG. 4 but are shown in at least FIG. 7 as piston end caps 124D-F, prevent the internal combustive forces and thrust forces from escaping around the piston vane 180.

Referring to FIG. 5 the unidirectional bearing 130A-C and the piston end caps 124A-B have been removed exposing the pistons 120A-C, peddle block 122, and other rotary engine 100 components. The pistons 120A-C are each configured to be operationally related to at least one of the unidirectional bearing 130 and piston shaft 126, illustrated as piston shafts 126A-C in FIG. 5. The unidirectional bearing 130 is not shown in FIG. 5 but is shown in at least FIG. 7, as unidirectional bearing 130A-C. A peddle block 122 is also illustrated positioned in the pathway of a piston vane 180, wherein as the piston vane 180 approaches the peddle block 122 a pressure increases against the piston vane 180 surface, the pressure, in part, causes the piston 120 to rotate around the peddle block 122 and self-align for a subsequent cycle. Each piston 120A-C is illustrated with four piston vanes 180. Each piston 120 can have a plurality of piston vanes 180. The number of piston vanes 180 per piston 120 can vary, as may be required and or desired in a particular embodiment. Each of the piston vanes 180 on a piston 120 can be integrally formed as part of the piston 120. Alternatively, piston vane 180 can be manufactured separately and fitted into the piston 120, as may be required and or desired in a particular embodiment.

Figure 6:
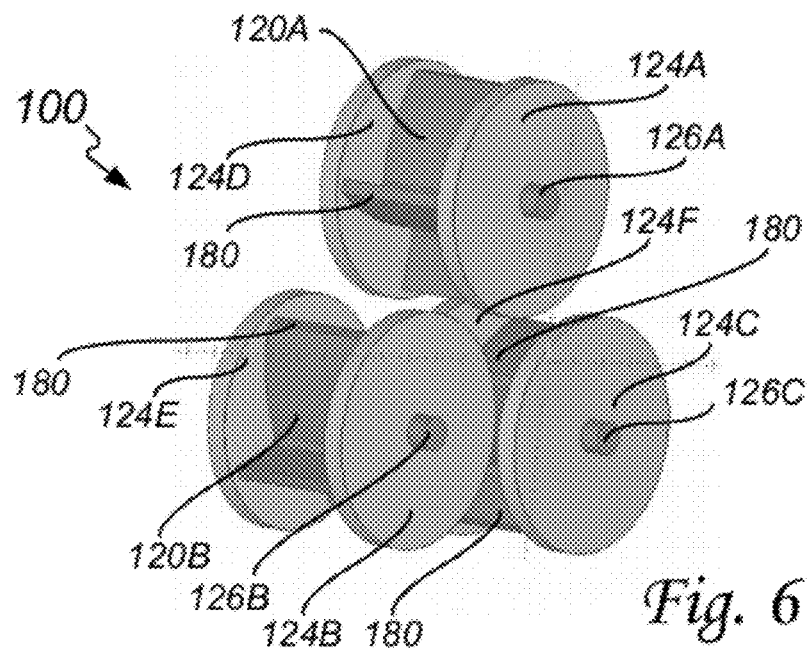

Referring to FIG. 6 there is illustrated an assembly of the pistons 120A-C with piston shafts 126A-C, piston end caps 124A-F, and other rotary engine 100 components. In an exemplary embodiment, the piston shaft 126, illustrated as piston shafts 126A-C can be a separately manufactured part and inserted into the piston 120, integrally formed as part of the piston 120, or integrated into the engine design in other ways, as may be required and or desired in a particular embodiment.

Figure 7:
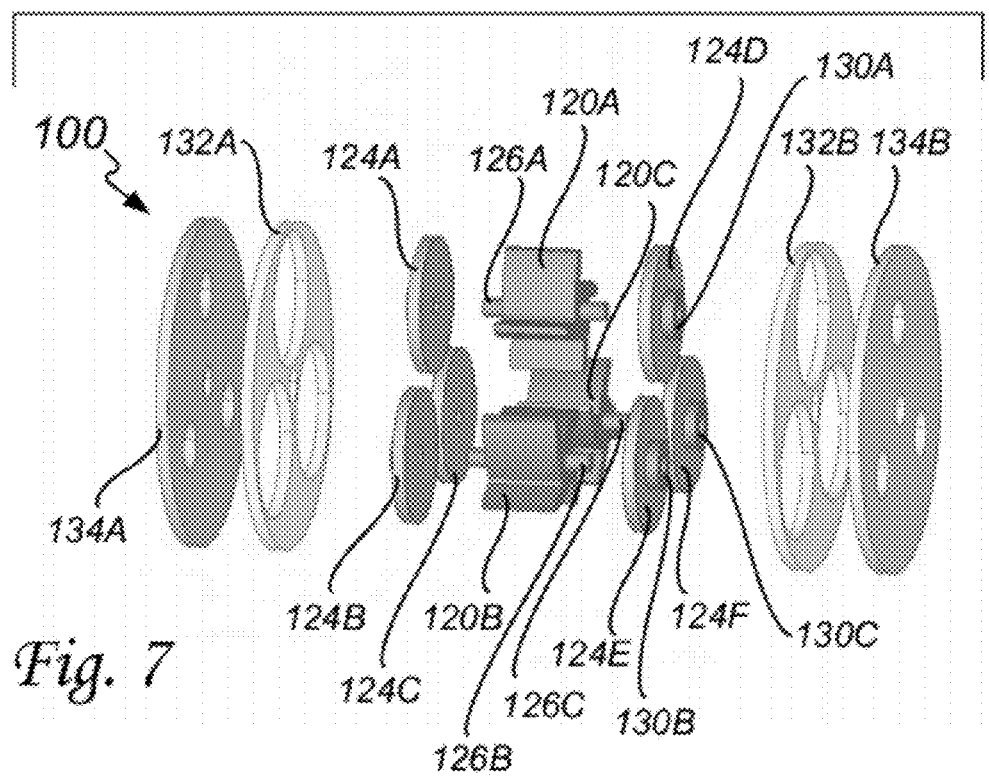

Referring to FIG. 7 there is illustrated an exploded view of the piston 120A-C, piston shafts 126A-C, piston end caps 124A-F, unidirectional bearing 130A-C, piston race 132A-B, bearing plate 134A-B, and other rotary engine 100 components. In an exemplary embodiment, the bearing plate 134A-B can secure a majority of the circular components within the outer case 114.

Referring to FIG. 8 the piston race 132 is removed exposing the piston block 142 having a plurality of piston block fastening holes 170. Also exposed is the peddle block 122, the pistons 120A-C, the piston shafts 126A-C, and other rotary engine 100 components. In an exemplary embodiment, the piston block 142 remains fixed with respect to the pistons 120A-C allowing the pistons 120A-C to rotate through the cutout portions. The drive shaft 128 is secured and operationally connected with the piston block 142 and other associated rotary engine 100 components, as may be required and or desired in a particular embodiment. In such an exemplary embodiment, the piston block 142, pistons 120, and other associated rotary engine 100 components can be configured to orbit or otherwise rotate around the drive shaft 128 as the drive shaft 128 rotates. In this regard, it is the combustive or thrust forces provided through inlet port 116 or ignited within the rotary engine 100 during the power portion of the cycle which presses against the piston vane 180 force side 184 that causes drive shaft 128 to rotate, as well as caused other engine components to orbit the drive shaft 128, such as the piston block 142, pistons 120A-C, and other associated rotary engine 100 components.

Figure 9:
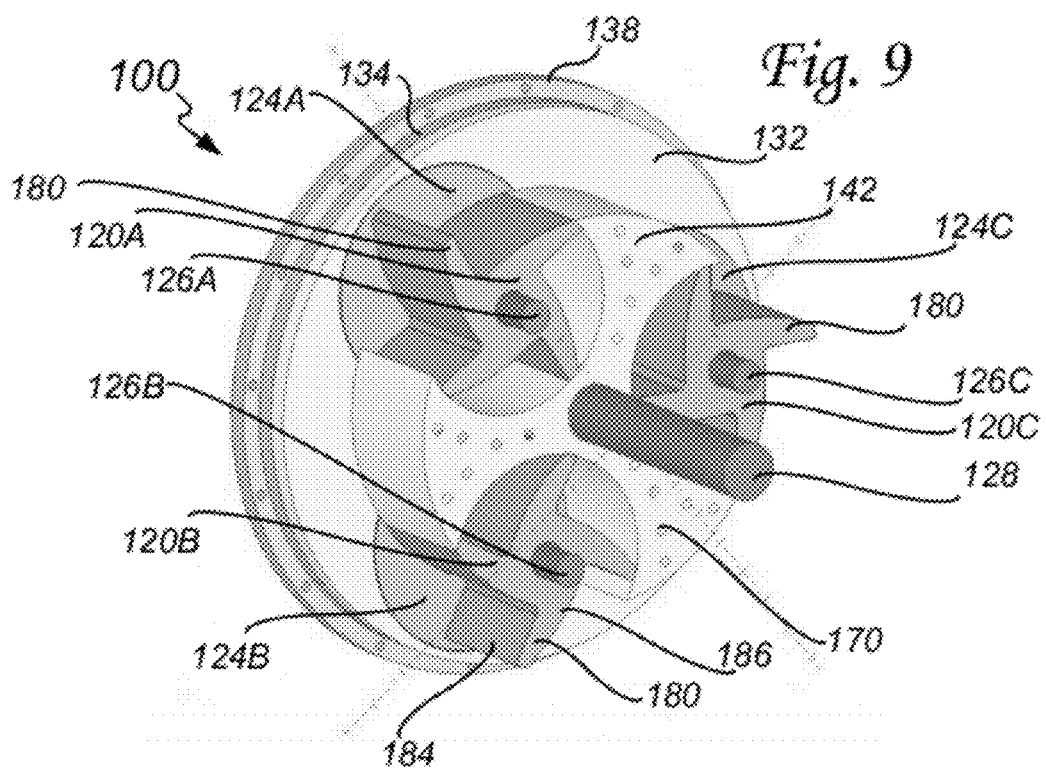

Referring to FIG. 9 the outer case 114 is removed better exposing the lid 138, piston race 132, bearing plate 134, piston end caps 124A-C, and other rotary engine 100 components. Furthermore, FIG. 9 also illustrates the piston vane 180 having a piston vane 180 force side 184 and piston vane 180 rotational side 186. The piston vane 180 force side 184 being the side that the combustive or thrust force pushes against during the power portion of the cycle and the piston vane 180 rotational side 186 is the side that approaches the peddle block 122, wherein as the piston vane 180 approaches the peddle block 122 a pressure increases against the piston vane 180 rotational side 186 surface, the pressure, in part, causes the piston 120 and associated piston vane 180 to rotate and self-align for a subsequent cycle.

In an exemplary embodiment, an improved rotary engine 100 having one positive motion stroke, also referred to as one power stroke can comprise at least one of a piston 120, the piston 120 further comprises at least one piston vane 180. At least one of a unidirectional bearing 130 is operationally coupled to the piston 120, wherein the piston 120 is configured to allow the piston vane 180 to rotate and the unidirectional bearing 130 prevents the piston vane 180 from rotating during combustion of fuel or thrust force injection. At least one of a peddle block 122 can be positioned in the pathway of the piston vane 180, wherein as the piston vane 180 approaches the peddle block 122 a pressure increases against the piston vane 180 surface, the pressure, in part, causes the piston 120 to rotate and self-align for a subsequent cycle.

In such an exemplary embodiment, an improved rotary engine 100 method having one positive motion stroke, also referred to as a power stroke can comprise injecting a fuel through an inlet port 116 into a volume between a piston 120 and a peddle block 122, the piston 120 further comprising at least one piston vane 180, at least one of a unidirectional bearing 130 is operationally coupled to the piston 120, wherein the piston 120 is configured to allow the piston vane 180 to rotate. A fuel is combusted against the piston vane 180 force side 184, wherein the unidirectional bearing 130 prevents the piston vane 180 from rotating during combustion of the fuel. A pressure is allowed to increase against the piston vane 180 rotational side 186 surface, as the piston vane 180 approaches the peddle block 122, the pressure, in part, causes the piston vane 180 to rotate and self-align for a subsequent cycle. The cycle can then be repeated by returning to the step of injecting.

In another exemplary embodiment, an improved rotary engine method having one positive motion stroke, also referred to as a power stroke can comprise creating a thrust force. The thrust force can be injected through an inlet port 116 into a volume between a piston 120 and a peddle block 122. The piston 120 further comprising at least one piston vane 180. At least one of a unidirectional bearing 130 is operationally coupled to the piston 120, wherein the piston 120 is configured to allow the piston vane 180 to rotate and the unidirectional bearing 130 prevents the piston vane 180 from rotating during injection of the thrust force against the piston vane 180 force side 184. A pressure is allowed to increase against the piston vane 180 rotational side 186 surface as the piston vane 180 approaches the peddle block 122, the pressure, in part, causes the piston vane 180 to rotate and self-align for a subsequent cycle. The cycle can then be repeated by returning to the step of creating.

In other exemplary embodiment, the piston 120 can orbit around a drive shaft 128 which is operationally related to the piston 120 and the piston vane 180 can rotate in the opposite rotational direction of the drive shaft 128 as the piston vane 180 approaches the peddle block 122.

In another exemplary embodiment, an optimal rotational speed of the piston vane 180 can be set by selectively venting secondary exhaust pressure from the piston vane 180, as the piston vane 180 approaches the peddle block 122.

Furthermore, the position of at least one piston 120 can be monitored to determine when to inject the thrust force.

Figure 10:
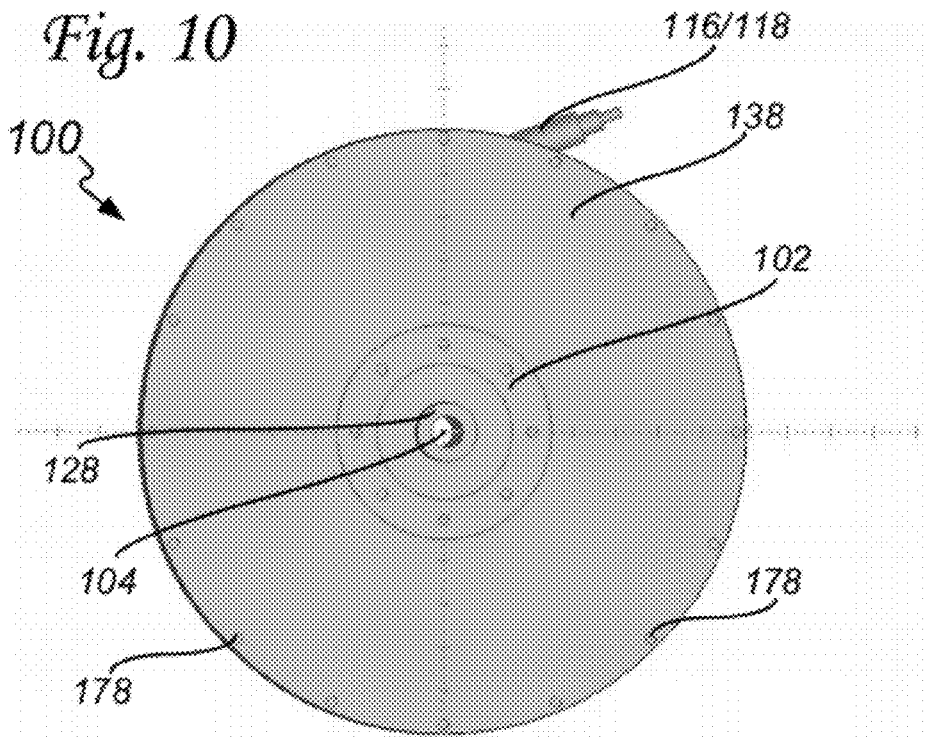
FIGS. 10-13 illustrate detailed view examples of a rotary engine cooling system.

Referring to FIGS. 10-13 there is illustrated detailed view examples of a rotary engine 100 cooling system. In an exemplary embodiment, FIG. 10 illustrates a rotary engine 100 sealed with at least one lid 138 and secured with fasteners 178. Such fasteners can be rivets, screws, and or other types and kinds of fasteners, as may be required and or desired in a particular embodiment. A flange 102 can be secured to the lid 138 on one or both sides of the rotary engine, as may be required and or desired in a particular embodiment. A drive shaft 128 is operational coupled to the other rotary engine 100 components. The drive shaft 128 having a bore hole 104 through which engine coolant liquid, also referred to as coolant or coolant liquid, can be circulated to cool the rotary engine 100.

Figure 11:
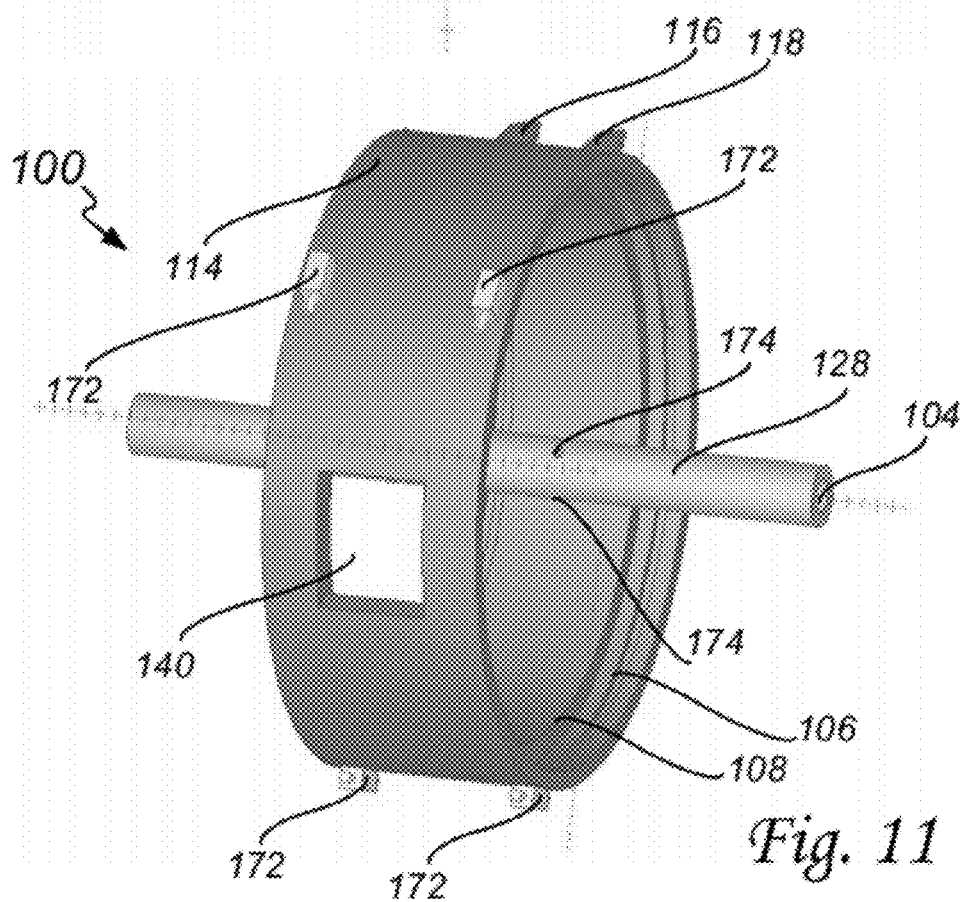

Referring to FIG. 11 the lid 138 and many of the other rotary engine 100 components have been removed exposing the drive shaft 128 and various other rotary engine 100 components. In an exemplary embodiment, the drive shaft 128 having a bore hole 104 can further comprise at least one of a coolant transmission hole 174 in fluid communication with the bore hole 104. Also illustrated in FIG. 11 is a plurality of coolant connectors 172. The coolant connectors 172 provides openings in the engine outer case 114 surface through which coolant liquid from a coolant fluid channel 106 can be circulated. The coolant fluid channel 106 is formed between the outer surface of an inner case wall 108 and the inner surface of the outer case 114. The coolant fluid channel 106 allows coolant to circulate through certain of the rotary engine 100 components, cooling the rotary engine 100 components and reaching the coolant fluid channel 106 around the outer perimeter of the channel formed between the inner case wall 108 and the inner surface of the outer case 114.

Figure 12:
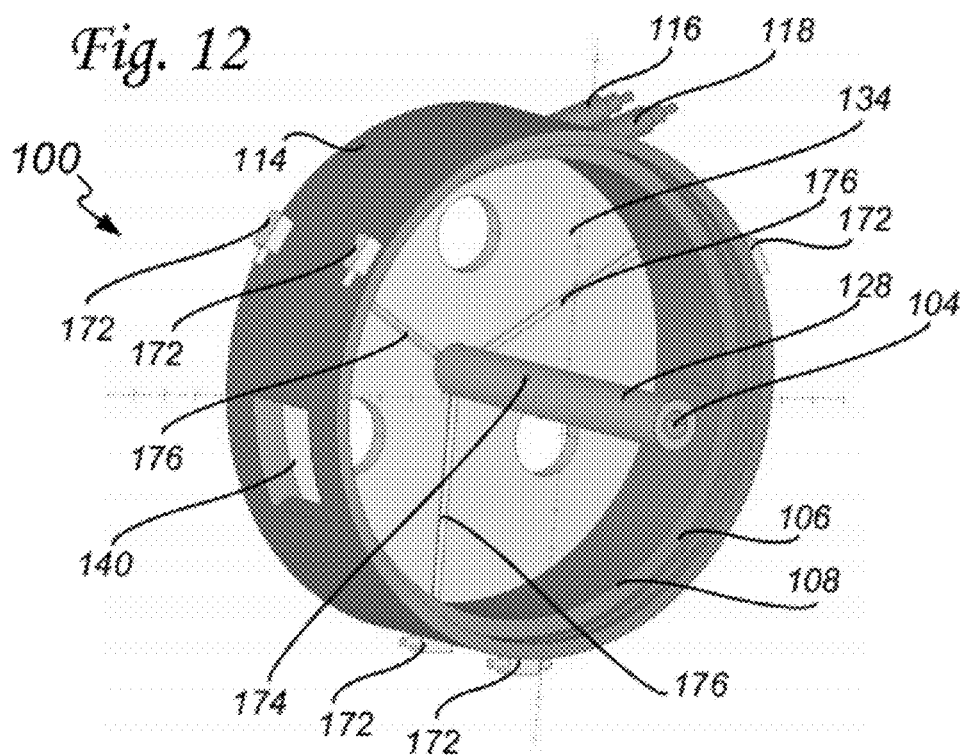
Figure 13:
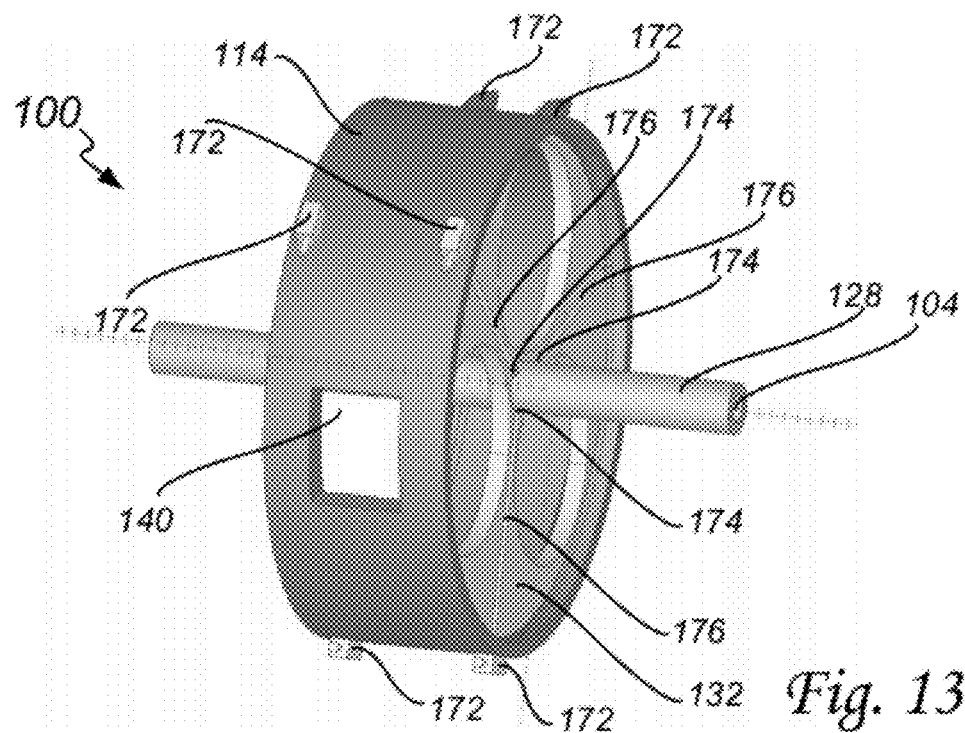

Referring to FIG. 12 there is illustrated how the bearing plate 134 further comprises at least one of a coolant distribution channel 176 configured to be in fluid communication with the coolant transmission hole 174. Referring to FIG. 13 there is illustrated how the piston race 132 can further comprise at least one of coolant distribution channel 176 configured to be in fluid communication with the coolant transmission hole 174. In an exemplary embodiment, each of the coolant distribution channels 176 is configured to be in fluid communication with at least one of the coolant transmission holes 174. In this regard, coolant liquid can flow from the bore hole 104 through the coolant transmission holes 174 and out to the rotary engine 100 components and coolant fluid channel 106 by way of at least one of the coolant distribution channel 176. Optionally the coolant distribution channel 176 can be integrally formed into the various rotary engine 100 components including the bearing plate 134, piston race 132, and or other types and kinds of rotary engine 100 components, as may be required and or desired in a particular embodiment.

In an exemplary embodiment, a system for cooling a rotary engine 100 can comprise a drive shaft 128 having a bore hole 104 and at least one of a coolant transmission hole 174 in fluid communication with the bore hole 104. At least one coolant distribution channel 176 can be in fluid communication with the coolant transmission hole 174. An outer coolant fluid channel 106 receives a coolant liquid from the coolant distribution channel 176, wherein the coolant liquid is circulated between the drive shaft 128 bore hole 104 and the outer coolant fluid channel 106 to cool the rotary engine 100.

An advantage of the present invention, in an exemplary embodiment, as many of the rotary engine 100 components rotate including the drive shaft 128 and coolant distribution channels 176, coolant liquid flows from the drive shaft 128 bore hole 104 through the coolant transmission holes 174 into and through the coolant distribution channels 176 and into the coolant fluid channel 106 by centripetal force. In this regard, with respect to circulating coolant through the rotary engine 100 to cool the rotary engine 100, the rotary engine 100 can operate or otherwise function as a centripetal force coolant liquid pump. In operation, a centripetal force pump, formed by at least the rotation of the drive shaft 128, can circulate the coolant liquid between the drive shaft 128 bore hole 104 and the outer coolant fluid channel 106 to cool the rotary engine 100.

In an exemplary embodiment, a system for cooling a rotary engine 100 can comprise a drive shaft 128 having a bore hole 104 and at least one of a coolant transmission hole 174 in fluid communication with the bore hole 104. At least one coolant distribution channel 176 is in fluid communication with the coolant transmission hole 174. At least one of an outer coolant fluid channel 106 receives a coolant liquid from the coolant distribution channel 176. A centripetal force pump form by at least the rotation of the drive shaft 128 circulates the coolant liquid between the drive shaft 128 bore hole 104 and the outer coolant fluid channel 106 to cool the rotary engine 100.

In another exemplary embodiment, a method for cooling a rotary engine 100 can comprise configuring a drive shaft 128 with a bore hole 104 and at least one of a coolant transmission hole 174 in fluid communication with the bore hole 104. Aligning at least one of a coolant distribution channel 176 in fluid communication with the coolant transmission hole 174. Receiving, from the coolant distribution channel 176, a coolant liquid in an outer coolant fluid channel 106 and circulating the coolant liquid between the drive shaft 128 bore hole 104 and the outer coolant fluid channel 106 to cool the rotary engine 100.

In other exemplary embodiment, a cooling system means 164 can be utilized to monitor the coolant liquid temperature and cause the system to circulate the coolant liquid. In addition, at least one of a coolant connector 172 affixed to the outer case 114 can allow liquid coolant to circulate between the coolant fluid channel 106 and the bore hole 104. Furthermore, the coolant liquid flow rate can be adjusted based, in part, on the RPM of the drive shaft 128.

Figure 14:
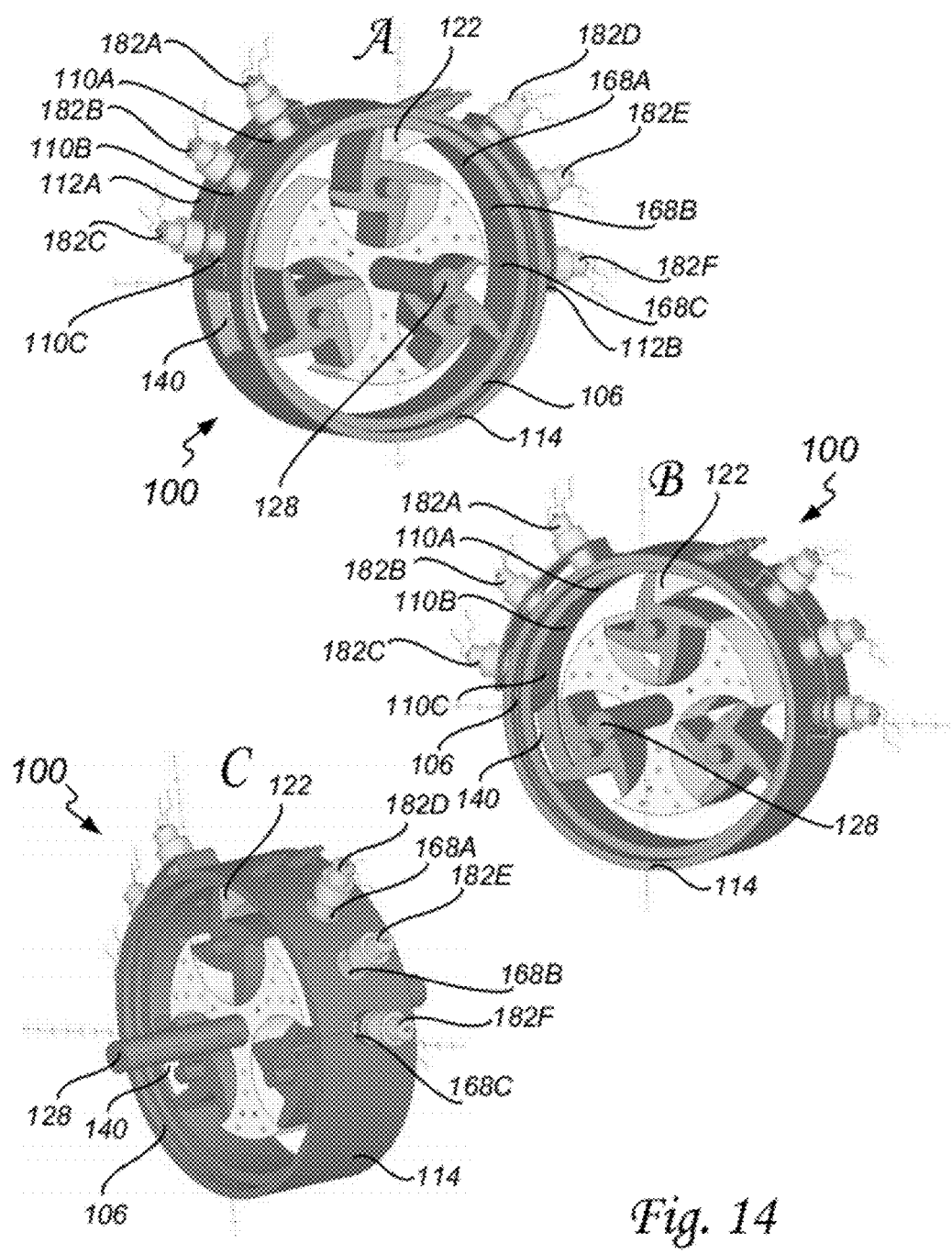
FIG. 14 illustrates one example of a variable orifice exhaust port system.

Referring to FIG. 14 there is illustrated one example of a variable orifice exhaust port system. The Figure illustrates three perspective views of rotary engine 100 labeled 'A', 'B', and 'C'. In an exemplary embodiment, the outer case 114 can have at least one variable orifice primary exhaust port 110, illustrated as variable orifice primary exhaust port 110A-C and at least one variable orifice secondary exhaust port 168, illustrated as variable orifice secondary exhaust port 168A-C, for venting either primary exhaust pressure, from the power portion of the cycle, also referred to as the combustive or thrust force portion of the cycle, or for venting the secondary exhaust pressure built up resultant, form a pressure increase, as the piston vane 180 approaches the peddle block 122.

Each of the variable orifice primary exhaust port 110A-C and variable orifice secondary exhaust port 168A-C can be operationally related to a threaded actuator 182, illustrated as threaded actuator 182A-F. A threaded actuator holding bracket 112, illustrated as threaded actuator holding bracket 112A-B can be utilized to hold the threaded actuator 182A-F. In operation, engine controller 150 by way of exhaust port control means 162, which can include the threaded actuators 182A-F, can be utilized to control the opening, partial closure, or total closure of each of the variable orifice primary exhaust port 110A-C and each of the variable orifice secondary exhaust port 168A-C. In this regard, performance of the rotary engine 100 can be adjusted, tuned, optimized, and or otherwise controlled.

In an exemplary embodiment, primary exhaust pressure is created between the peddle block 122 and the piston vane 180 force side 184. Primary exhaust port 140 typically vents a relatively fixed portion of the primary exhaust pressure. Notwithstanding, the variable orifice primary exhaust port 110A-C, by way of the threaded actuators 182A-C, can be opened, partially opened, or closed individually to adjust venting of more or less of the primary exhaust pressure. This primary exhaust pressure, in part, controls the rotational speed also referred to as revolutions per minute (RPM) of the rotary engine 100. In general, increasing the primary exhaust pressure causes the rotary engine 100 rotational speed to increase RPM.

In general, in an exemplary embodiment, for example and not a limitation, in low RPM applications, to control the rotational speed of the rotary engine 100, in part, the variable orifice primary exhaust port 110, by way of the threaded actuators 182A-C can be adjusted to vent more primary exhaust pressure to decrease the rotary engine 100 RPM or vent less of the primary exhaust pressure to increase the rotary engine 100 RPM.

In high RPM applications the challenge becomes exhausting the rotary engine 100 quickly enough so that the exhaust does not inhibit the rotary engine from increasing RPM. In this regard, if we increase the rate the exhaust can escape the ability to increase the RPM increases. In an exemplary embodiment, this is one way in which the variable primary exhaust port is utilized. As such, if the exhaust port is opened too far at low RPM exhaust pressure is lost, which can slow the RPM. The contrary is true at high RPM.

With regards to the secondary exhaust pressure, which is formed between the piston vane 180 rotational side 186 and the peddle block 122, as the piston vane 180 approached the peddle block 122, the variable orifice secondary exhaust port 168A-C, by way of the threaded actuators 182D-F can be opened, partially opened, or closed individually to adjust venting of more or less of the secondary exhaust pressure. This secondary exhaust pressure, in part, can control the rotational speed or RPM of both the rotary engine 100 and piston vane 180. In general, increasing the secondary exhaust pressure can cause the piston vane 180 rotational speed to increase as well as cause the rotary engine 100 RPM to increase by recirculating more of the secondary exhaust pressure into the next engine cycle.

To control the rotational speed of the piston vane 180 and minimize the chance of under or over rotation, which can cause the piston vane 180 to hit or otherwise impact the peddle block 122, the variable orifice secondary exhaust port 168A-C, by way of the threaded actuators 182D-F can be adjusted to vent an optimum amount of the secondary exhaust pressure. Such venting of the secondary exhaust pressure in turn controls or otherwise sets the rotational speed of the piston 120 and determines how much of the secondary exhaust pressure is recirculated for the next engine cycle.

In an exemplary embodiment the secondary exhaust pressure should be adjusted such that the rotational speed of the piston 120 enables the piston vane 180 to rotate around the peddle block 122, as it approaches and moves past the peddle block 122. In this regard, the piston vane 180 on approach to the peddle block 122 rotates in the opposite direction to the rotation of the piston block 142 and drive shaft 128 allowing the piston vane 180 to rotate around and avoid hitting the peddle block 122. As such, adjusting the secondary exhaust pressure, by way of the variable orifice secondary exhaust port 168A-C and the threaded actuators 182D-F optimally sets the rotational speed of the piston 120 so that the piston vane 180 rotates and avoids hitting the peddle bock 122. Optimally, setting the rotational speed of the piston vane 180 improves the rotary engine 100 performance. In at least FIGS. 15-17 additional disclosure related to engine timing, secondary exhaust pressure change, primary and secondary exhaust pressure flow, and engine efficiency and performance is provided.

In an exemplary embodiment a system for improving the performance of a rotary engine 100 can comprise at least one piston 120, the piston 120 further comprising at least one piston vane 180, wherein the piston 120 is configured to allow the piston vane 180 to rotate. At least one of a peddle block 122 can be positioned in the pathway of the piston vane 180, wherein as the piston vane 180 approaches the peddle block 122 a pressure increases against the piston vane 180 rotational side 186 surface, the pressure, in part, causes the piston vane 180 to rotate and self align for a subsequent cycle. A variable orifice secondary exhaust port selectively adjusts venting of the secondary exhaust pressure from the piston vane 180 rotational side 186, as the piston vane 180 approaches the peddle block 120, to improve the performance of the rotary engine 100.

In another exemplary embodiment, a method of improving the performance of a rotary engine 100 can comprise changing the RPM of the rotary engine 100. A rotational speed of the piston vane 180 can be determined to minimize under or over rotation of the piston 120, as the piston vane 180 rotational side 186 approaches the peddle block 122. This can allow the piston vane 180 to rotate around the peddle block 122. At least a portion of an exhaust pressure between a piston vane 180 piston vane rotational side 186 and a peddle block 122 positioned in the pathway of the piston vane 180 can be vented to set the rotational speed of the piston vane 180.

Another advantage of the present invention is that a turbocharging effect can be controlled by way of adjusting the secondary exhaust pressure using the variable orifice secondary exhaust port 168A-C and the threaded actuators 182D-F. In this regard, secondary exhaust pressure that is not vented external to the rotary engine 100 outer case 114 is recirculated around the piston 120 as it rotates and directed back into the engine for the next cycle. At least FIG. 18 illustrates this effect, as piston vane 180 self-alignment rotational direction 208 and secondary exhaust directional flow 210D.

In an exemplary embodiment, a method for improving the performance of a rotary engine can comprise increasing a primary exhaust pressure by reduction of aperture size of at least one of the variable orifice primary exhaust port 110. The secondary exhaust pressure between a piston vane 180 rotational side 186 and a peddle block 122 positioned in the pathway of the piston vane 180 can be adjusted by changing the aperture size of at least one of the variable orifice secondary exhaust port 168 and recirculating the remaining portion of the secondary exhaust pressure back into the engine for the next cycle, as the piston vane 180 rotates around the peddle block 122, wherein the rotary engine RPM increases, effectively turbo-charging the rotary engine 100.

Figure 15:
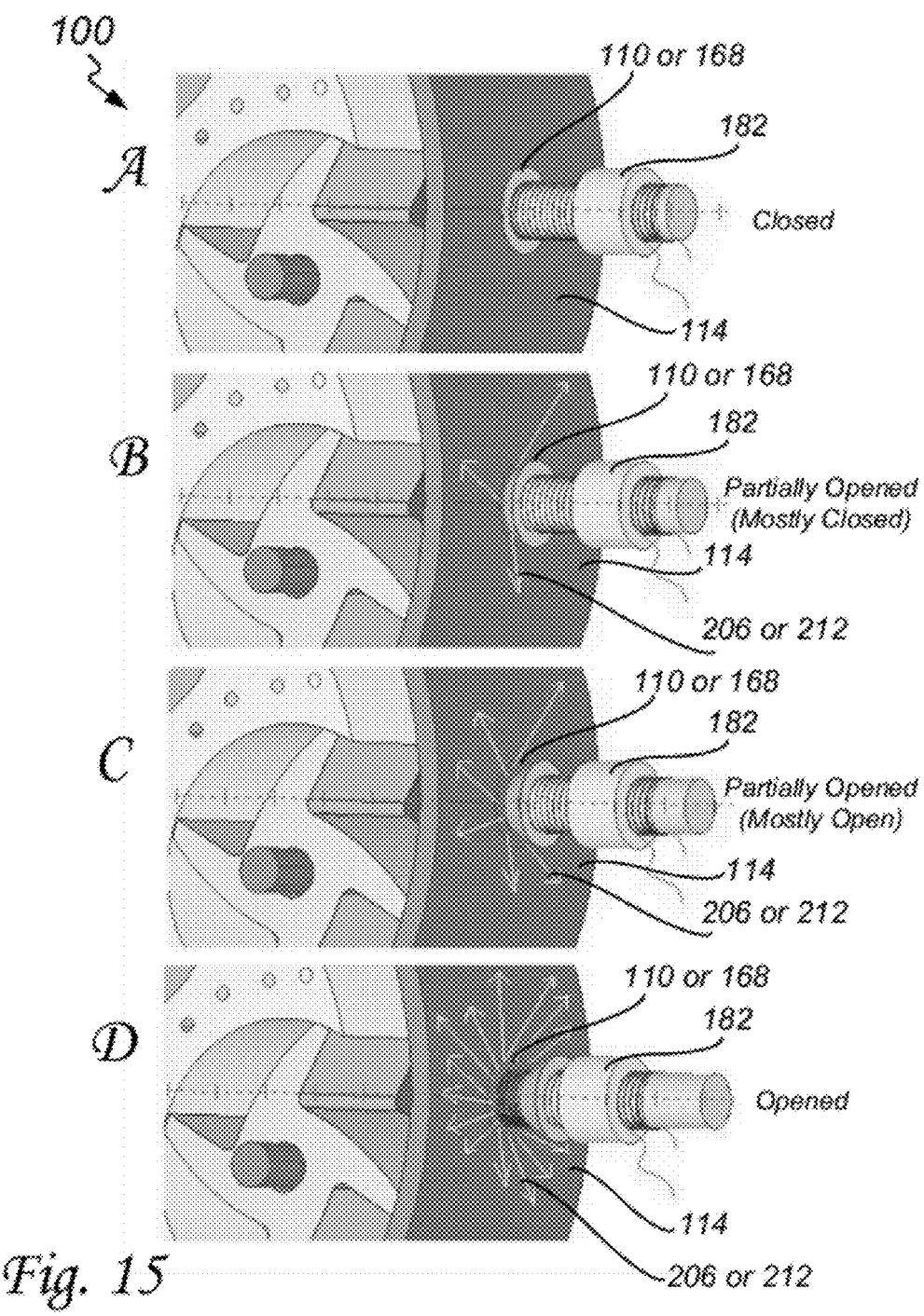
FIG. 15 illustrates one example of the threaded actuator in a variety of positions.

Referring to FIG. 15 there is illustrates one example of the threaded actuator 182 in a variety of positions. In an exemplary embodiment, under control of the engine controller 150 and the exhaust port control means 162 the primary exhaust pressure 206 and or secondary exhaust pressure 212 can be vented, in controlled portions, by adjusting the threaded actuator 182. At least FIG. 14 illustrates how the thread actuators 182A-C can be distributed around the outer housing 114 and configured to vent primary exhaust pressure 206, by way of a variable orifice primary exhaust port 110A-C. In addition, at least FIG. 14 illustrates how the thread actuators 182D-F can be distributed around the outer housing 114 and configured to vent secondary exhaust pressure 212, by way of a variable orifice secondary exhaust port 168A-C.

FIG. 15 illustrates just a single threaded actuator 182 and is illustrative of how the threaded actuator 182 can be configured into an operational relationship with a variable orifice 110 and or 168 to control the amount of vented pressure 206 and or 212. As such, the nomenclature in FIG. 15 of 110 or 168 and 206 or 212 is not intended to mean that the opening is both a primary and secondary variable orifice exhaust port 110 and 168 nor is the nomenclature intended to mean that the exhaust pressure is both a primary and secondary pressure 206 and 212. The intent is FIG. 15 is just to illustrate how the threaded actuator 182 can be used and how the variable orifice can be configured to be open, partially open (ranging from mostly open to mostly closed and all point in between), or closed. Furthermore, in an exemplary embodiment, there can be any number of threaded actuators 182 positioned around the outer housing 114 to vent exhaust pressure, as may be required and or desired in a particular embodiment.

For purposes of disclosure the threaded actuators are not limited to a finite number of positions such as those shown in FIG. 15, views 'A'-'D'. Rather, any number of positions can be configured from open to close and any partially open position in between, as may be required and or desired in a particular embodiment. In addition, each of the plurality of actuators 182 that may be used in an embodiment can be controlled in groups or individually controlled by engine controller 150, by way of exhaust port control means 162, as may be required and or desired in a particular embodiment.

Referring to FIG. 15, in view 'A' the threaded actuator 182 is fully extended and blocks the entire variable orifice exhaust port such that very little if any exhaust pressure can escape the variable orifice exhaust port opening. This can be referred to as the closed position.

In view 'B' the threaded actuator 182 is mostly extended blocking most of the variable orifice opening. This can be referred to as partially open and or mostly closed position. In this configuration a variable amount of exhaust gas can be vented. The exact amount of vented exhaust gas depends on how much of the variable orifice exhaust port is blocked.

In view 'C' the threaded actuator 182 is mostly retracted blocking only a small portion of the variable orifice opening. This can be referred to as partially open and or mostly open position. In this configuration a variable amount of exhaust gas can be vented. The exact amount of vented exhaust gas depends on how much of the variable orifice exhaust port is blocked.

In view 'D' illustrates how the threaded actuator 182 can be retracted opening the variable orifice hole. This can be referred to as the open position. In this configuration the maximum amount of exhaust gas can be vented from the variable orifice exhaust port 110 or 168.

In an exemplary embodiment, an optimal rotational speed of the piston vane 180 by selectively venting secondary exhaust pressure from the piston vane 180, as the piston vane 180 approaches the peddle block 122. In addition, a variable orifice secondary exhaust port 168 selectively vents at least a portion of the secondary exhaust pressure 212, away from the piston vane 180 setting an optimal rotational speed of the piston vane, improving performance of the rotary engine.

In another exemplary embodiment, at least one of a threaded actuator 182 is adapted to vary the orifice size of the variable orifice secondary exhaust port 168. In addition, a variable orifice primary exhaust port 110 selectively vents at least a portion of the primary exhaust pressure 206, wherein change in aperture size of the variable orifice primary exhaust port 110 causes corresponding change in aperture size of the variable orifice secondary exhaust port 168.

In another exemplary embodiment, the secondary exhaust pressure 212 can be adjusted to minimize over and under rotation of the piston vane. In addition, at least a portion of the secondary exhaust pressure 212 can be recirculated, as the piston vane rotates around the peddle block 122. Furthermore, change of RPM and rotational dynamics of the piston vane can be coordinated, by adjusting the amount of a primary exhaust pressure 206 and the amount of the secondary exhaust pressure 212 that is vented.

Figure 16:
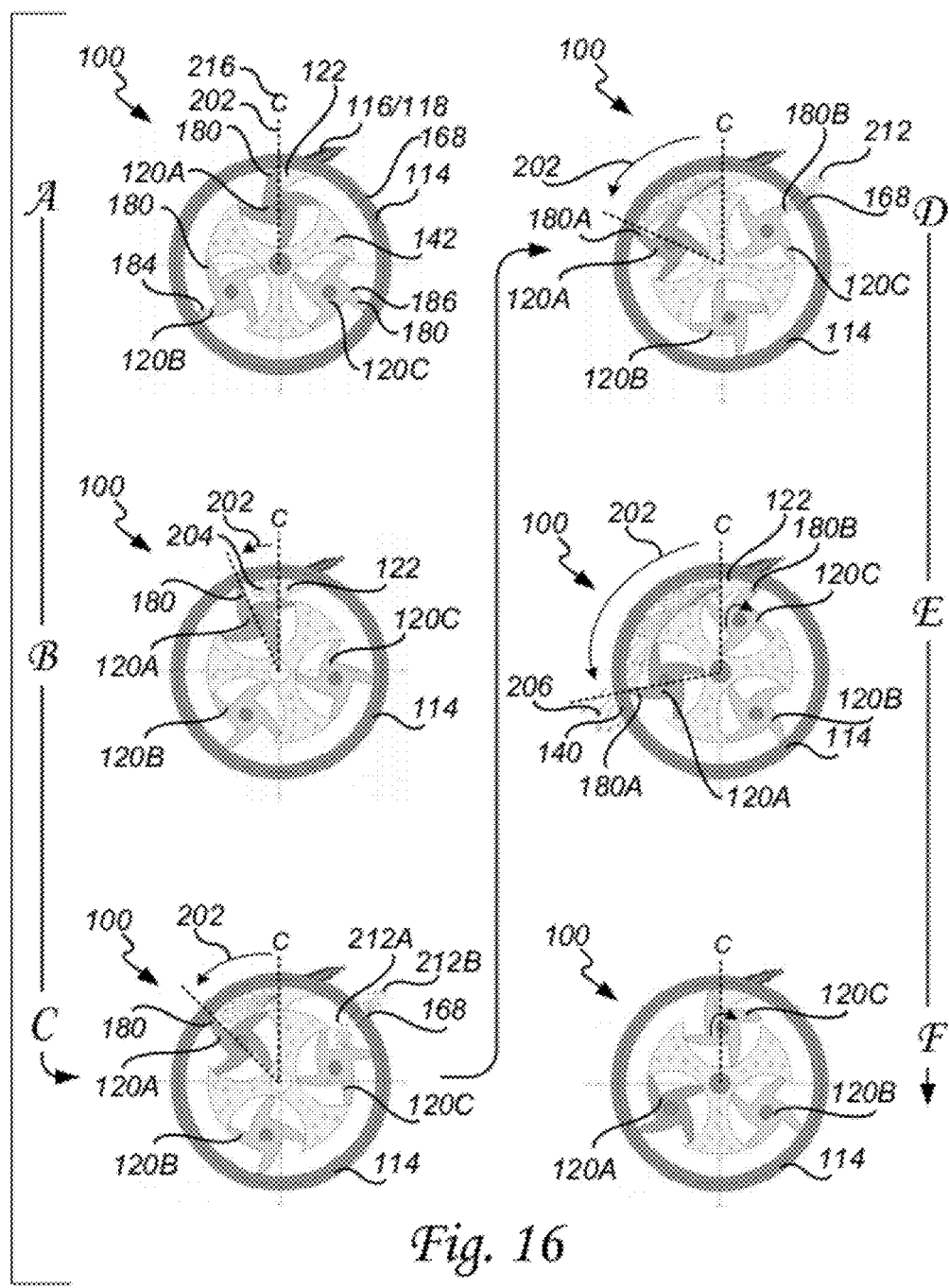
FIG. 16 illustrates one example of a rotary engine having one positive motion stroke timing sequence, also referred to as a rotary engine cycle.

Referring to FIG. 16 there is illustrated one example of a rotary engine 100 timing sequence, also referred to as a rotary engine 100 cycle. In an exemplary embodiment, referring to FIG. 16 there is illustrated six positions labeled 'A'-'F' of rotary engine 100 timing. A center position 216 references the top center position of the circular portion of the rotary engine 100. Position 'A' can represent the start of a cycle. For purposes of disclosure a cycle, as in a rotary engine 100 cycle is defined as a series of events that are regularly repeated in the same order. These successive series of events accumulate into a revolution of the rotary engine 100. Such revolutions are themselves cumulative and as such the rotation of the engine can be referred to and measured as the rotary engine revolutions per minute (RPM).

Moving to position 'B' the pistons 120A-C, piston block 142, and other associated components rotate counter clockwise indicated by displacement 202. A combustive or a thrust force can be injected through inlet 116 between the peddle block 122 and the piston vane force side 184 of piston vane 180. This portion of the cycle can be referred to as the power, combustive or a thrust force portion of the cycle.

For purposes of disclosure a combustive fuel can be a gas, a fossil fuel such as petroleum gas, renewable fuel ethanol, hydrogen gas mixture, a combustive fuel source mixture with air and or other types or kinds of combustive fuels or combinations thereof that can be injected through an inlet port, such as inlet port 116 and ignited by an ignition source such as ignition source 118. Furthermore, a thrust force can be a combustive fuel source combusted external to the outer case 114 and whose force is then injected into the rotary engine 100 as a thrust force through an inlet port, such as inlet port 116. Alternatively, a thrust force can be an air pressure, other gas pressure, water pressure, or other types or kinds of thrust forces or combinations thereof that can be injected through an inlet port, such as inlet port 116 that have been pressurized externally to the outer case 114 and whose force is then injected into the rotary engine 100.

Moving to position 'C' the pistons 120A-C, piston block 142, and other associated components continue to rotate counter clockwise indicated by displacement 202. The combustive force from ignition of the fuel source internal to the rotary engine 100 outer case 114 or from the thrust force create external to the outer case 114 and then injected into the rotary engine 100, by way of an inlet port 116, continues to turn the drive shaft 128. As piston 120C approaches the peddle block 122 a secondary exhaust pressure 212A increases between the piston vane 180 rotational side 186 and the peddle block 122. As the secondary exhaust pressure increases at least a portion of the pressure can be vented, illustrated as 212B, by way of the variable orifice secondary exhaust port 168. Such secondary exhaust venting can be controlled by way of the threaded actuators 182, that are configured to be operationally related to the variable orifice secondary exhaust port 168, such that selectively the variable orifice secondary exhaust port 168 can be opened, partially opened, or closed, as may be required and or desired in a particular embodiment.

Moving to position 'D' the pistons 120A-C, piston block 142, and other associated components continue to rotate counter clockwise indicated by displacement 202. Piston 120C moves closer to the peddle block 122 and secondary exhaust 212 is vented to a reach a predetermined pressure. The secondary exhaust pressure 212 remaining is used to rotate the piston 120C, as it continues approaching the peddle block 122.

Moving to position 'E' the primary exhaust pressure 206 is vented by way of the primary exhaust port 140 and the variable orifice primary exhaust port 110. Such primary exhaust pressure 206 venting can be controlled by way of the threaded actuators 182 that are configured to be operationally related to the variable orifice primary exhaust port 110, such that selectively the variable orifice primary exhaust port 110 can be opened, partially opened, or closed, as may be required and or desired in a particular embodiment.

In an exemplary embodiment, the secondary exhaust pressure 212 remaining between the peddle block 122 and the piston vane 180 rotational side 186 causes the piston 120C to rotate in a clockwise direction around the peddle block 122. In this regard, the unidirectional bearing 130 allows the piston 120C to rotate clockwise, in an opposite rotational direction of the drive shaft 128 and the piston block 142 assemble.

In operation, the amount of secondary exhaust pressure 212, in part, determines the rotational speed of the piston 120C. As such, engine controller 150 by way of the exhaust port control means 162, better illustrated in at least FIGS. 18-19, can vent an optimum amount of secondary exhaust pressure 212 to set the desired rotational speed of the piston 120C and associated piston vane 180. Such optimum rotational speed of the piston 120C and associated piston vane 180 is the rotational speed that allows the piston 120C and associated piston vane 180 to not over or under rotate and hit or otherwise impact the peddle block 122. In other words, the optimum rotational speed of the piston 120C is that rotational speed which allows the piston 120C to rotate around, without hitting, the peddle block 122, as the piston vane 180 of piston 120C approaches the peddle block 122.

Moving to position 'F' piston 120C completes the clockwise rotation around the peddle block 122 and the rotary engine 100 cycle is complete and ready for the next cycle returning to position 'A'.

Figure 17:
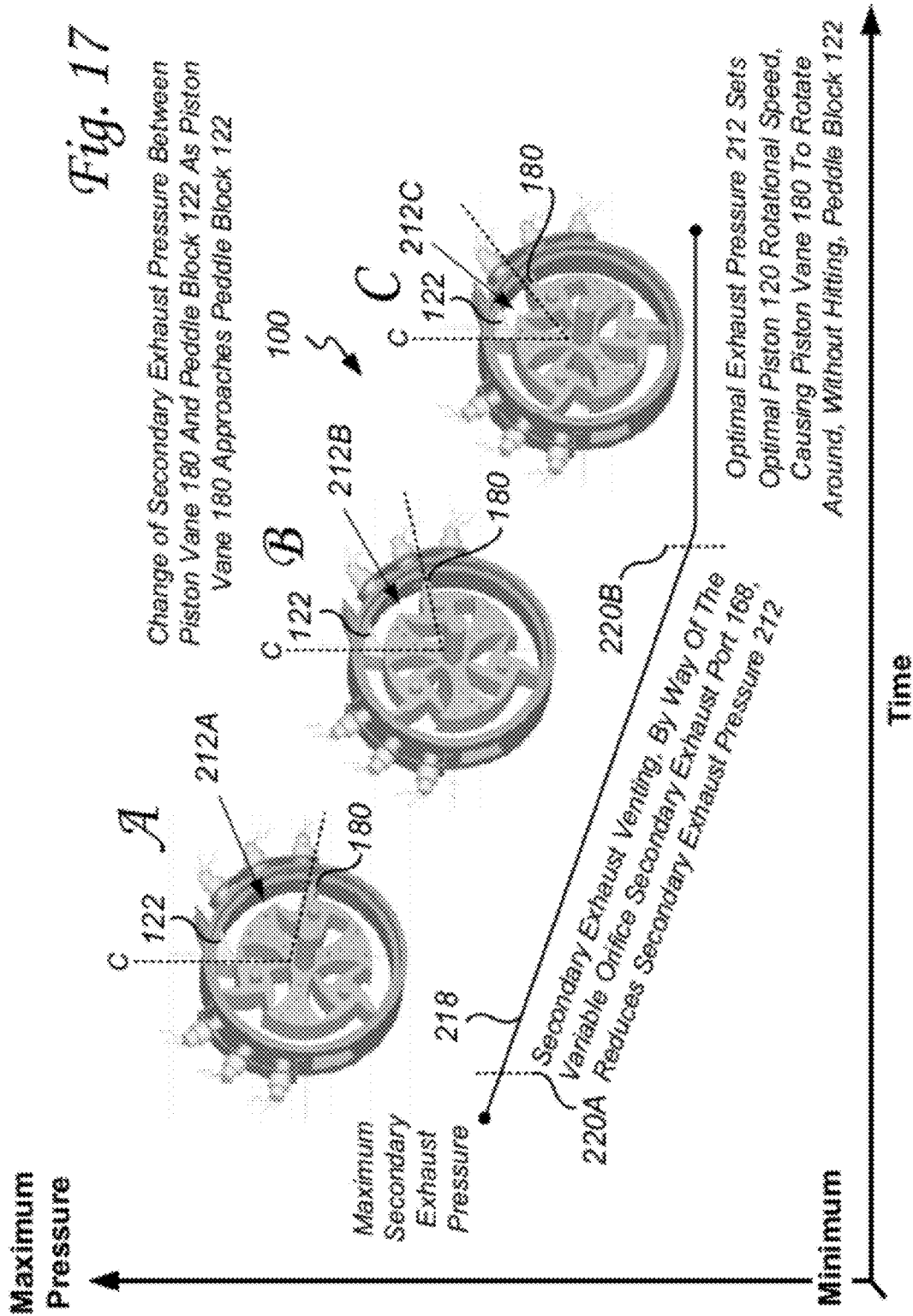
FIG. 17 illustrates one example of secondary exhaust pressure change, as the piston vane approaches the peddle block.

Referring to FIG. 17 there is illustrated one example of secondary exhaust pressure change as the piston vane approaches the peddle block. In an exemplary embodiment, FIG. 17 illustrates how the maximum secondary exhaust pressure is vented to reach an optimal secondary exhaust pressure, which in turn produces the optimal piston vane 180 rotational speed to effectuate the ability of the piston vane 180 to rotate around the peddle block 122 on approach. In this regard, avoiding piston vane 180 over or under rotation, which can cause the piston vane 180 to hit or otherwise impact the peddle block 122.

Illustrated in FIG. 17 are rotary engine 100 views 'A', 'B', and 'C'. These views indicated the relative position of the piston vane 180 with respect to the peddle block 122 at different times in the rotary engine 100 cycle. The rotary engine 100 cycle can be referred to as having one positive motion stroke, also referred to as one power stroke, since there is only a repetitive combustive force or thrust force input into the engine cycle and the engine does not require any motions or cycles that operate against the rotational direction of the rotary engine 100. The graph 218 indicates the secondary exhaust pressure represented as 212A-C as the rotary engine 100 cycle advances from view 'A' through view 'C'. In this regard, the secondary exhaust pressure 212A in view 'A' is maximum as the piston vane 180 begins to approach the peddle block 122. As the rotary engine 100 cycle progresses through the cycle to view 'B' the graph 218 indicates that at least a portion of the secondary exhaust pressure, illustrated as 212B is vented, by way of the variable orifice secondary exhaust port 168 out of the outer case 114. The graph 218 illustrates this venting between the dotted lines 220A-B. As the rotary engine 100 cycle progresses and the piston vane 180 reaches the peddle block 122 in view 'C', the secondary exhaust pressure, illustrated as 212C, is better optimized and relatively constant as now the remaining secondary exhaust pressure begins to turn the piston vane 180, of a piston 120, around the peddle block 122.

In an exemplary embodiment, the optimized secondary exhaust pressure 212 is the pressure that is needed to set the optimal piston vane 180 rotational speed. Such an optimum piston vane 180 rotational speed is the speed that prevents the piston from over or under rotating, as the piston 120 and associated piston vane 180 moves to and rotates around the peddle block 122. The optimum piston vane 180 rotational speed and thus the optimum secondary exhaust pressure 212 is that piston 120 rotational speed and secondary exhaust pressure 212 that rotates the piston 120 and associated piston vane 180 around the peddle block 122, without hitting, or otherwise impacting the peddle block 122 as the piston vane 180 rotates.

In operation, an engine control system 150 can be utilized to monitor and control the thrust creation means 158, operational control means 160, engine monitoring means 148, exhaust port control means 162, fuel means 144, spark means 146, and other mechanisms and methods to determine and control the optimum secondary exhaust pressure 212 and thus the optimum rotation speed of the piston vane 180.

In an exemplary embodiment, a method of improving the performance of a rotary engine 100 can comprise changing the RPM of the rotary engine 100. The rotational speed of the piston vane 180 can be determined to minimize under and over rotation and allow a piston vane 180 to rotate around a peddle block 122. At least a portion of a secondary exhaust pressure between a piston vane 180 and a peddle block 122 positioned in the pathway of the piston vane 180 can be vented to set the optimal rotational speed of the piston vane 180.

Referring to FIG. 18 there is illustrated one example of the primary and secondary exhaust pressure flow through the rotary engine 100. View 'A' illustrates a single peddle block 122 embodiment and view 'B' illustrates how a multiple peddle block 122A-B can be implemented. Referring to FIG. 18 view 'A' there is illustrated a rotary engine 100 view, which indicates the primary and secondary exhaust pathway 210A-D also referred to as the exhaust flow 210A-D, as the rotary engine 100 progress through a cycle. In this regard, combustive force or thrust force creates primary exhaust 206. A portion of the primary exhaust 206 is vented through the primary exhaust port 140 and or the variable orifice primary exhaust port 110. The path the primary exhaust follows is illustrated by exhaust pathway 210A. A portion of the exhaust illustrated as exhaust pathway 210B, from the prior combustive force or thrust force remains between the piston vane 180A rotational side 186 and the piston vane 180B force side 184.

Similarly, a portion of the exhaust illustrated as exhaust pathway 210C from two prior combustive forces or thrust forces remains between the piston vane 180B rotational side 186 and the piston vane 180C force side 184. This exhaust 210C can be referred to as secondary exhaust pressure 210. At least a portion of the secondary exhaust pressure can be vented, illustrated as 212, by way of the variable orifice secondary exhaust port 168 to set the rotational speed of piston 120C and associated piston vane 180C. For disclosure purposes the secondary exhaust pressure can be referred to as secondary exhaust pressure 212.

The rotational speed should be set as to avoid the piston vane 180C from hitting or otherwise impacting the peddle block 122 and instead smoothly rotate around the peddle block 122 as the piston vane 180C approaches the peddle block 122. The remaining exhaust pressure illustrated as exhaust pathway 210D is recirculated as the piston 120C rotates providing a turbo charging effect for the next power cycle.

In operation, the piston 120C rotates clockwise in the opposite rotational direction with respect to the rotation of the piston block 142 and exhaust pressure 210A-D. This rotary engine cycle can be referred to as having one positive motion stroke since there is only a repetitive power stroke, also referred to as combustive force or thrust force input into the engine cycle and therefore does not require any motions or cycles that operate against the rotational direction of the rotary engine 100.

In an exemplary embodiment, a method for improving the performance of a rotary engine can comprise increasing a primary exhaust pressure by reduction of aperture size of at least one of a variable orifice primary exhaust port 110. Adjusting the secondary exhaust pressure 212 between a piston vane 180 rotational side 186 and a peddle block 122 positioned in the pathway of the piston vane 180 by changing the aperture size of at least one of a variable orifice secondary exhaust port 168 and recirculating the remaining portion of the secondary exhaust pressure 212 as the piston vane 180 rotates around the peddle block 122, wherein the rotary engine RPM increases, effectively turbo-charging the rotary engine 100.

Referring again to FIG. 18 view 'B' there is illustrated how more than one peddle block 122 can be utilized. In this regard, shown in view 'B' is an embodiment which utilizes two peddle blocks 122A-B and provides for multiple inlet ports 116 and ignition sources 118. An advantage of multiple peddle blocks is that firing sequences can be alternated between both peddle blocks 122A-B. In a three piston embodiment this can effectively double the power, six firings opposed to three firings per rotation. In a plurality of exemplary embodiments there can be at least one peddle block 122 up to any number of peddle blocks, as may be required and or desired in a particular embodiment.

Figure 19:
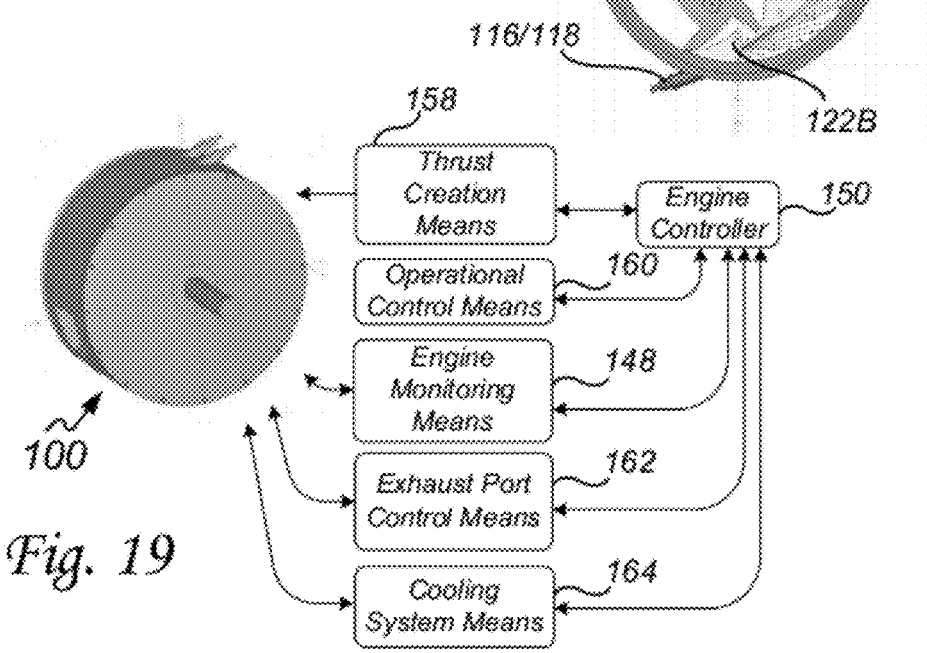
FIGS. 19-20 illustrate examples of a rotary engine control system.

Referring to FIGS. 18-19 there is illustrated examples of a rotary engine 100 control system. FIG. 19 illustrates one example of a control system utilizing a thrust force or combustive force created external to the rotary engine 100 outer case 114 and injected into the inlet port 116. In this regard, an engine controller 150 can be operationally related with a thrust creation means 158, an operational control means 160, and engine monitoring means 148, an exhaust port control means 162, a cooling system means 164, and or other types and kinds of functional systems and methods, as may be required and or desire in a particular embodiment.

An engine controller 150 can be a microcomputer, and or other types and kinds of engine controllers. In operation, the engine controller 150 can interface with, monitor, determine, and control the operational performance of the rotary engine 100. Such an engine controller 150 can have a memory that can be encoded with computer instructions that when executed perform the task of monitoring, determining, and controlling the rotary engine 100.

Use of the term 'engine control system' or 'engine control unit', or 'engine controller' such as engine controller 150, in the present invention, is intended to include a type of electronic control that controls a series of actuators and other controls on the rotary engine 100 to ensure the engine's optimum running. It does this by reading values from a multitude of sensors associated with the rotary engine 100, interpreting the data, and adjusting the rotary engine 100 actuators accordingly.

A thrust control means 158 can be a device for controlling the combustion of a combustive fuel source external to the outer case 114 and then injecting the combustive force into the rotary engine 100 through an inlet port, such as inlet port 116. Alternatively, thrust control means 158 can be a device for controlling external to the outer case 114 an air pressure, other gas pressure, water pressure, or other types or kinds of pressure that can be injected through an inlet port, such as inlet port 116. In general, the thrust control means 158 can be a controller, valve, actuator, and or metering system operationally connected with a combustive source or thrust force that under control of engine controller 150 can be injected precisely in accordance with the rotary engine timing cycle into the rotary engine by way of inlet 116 to effectuate the power stroke portion of the one positive motion stroke.

The operational control means 160 can be user controls such as a fuel throttle, gas peddle, hand throttle, user speed and performance inputs such as selecting gears, speed changing devices, engine load devices, and or other types and kinds of operational control means 160, as may be required and or desired in a particular embodiment.

The engine monitoring means 148 can be switches, sensors, optical sensors, general purpose input/output devices and systems, magnets, hall effect sensors, chemical sensors, oxygen and or other gas sensors, vacuum sensors, and or other types and kinds of engine monitoring means 148, as may be required and or desired in a particular embodiment.

The exhaust port control means 162 can include at least one of a threaded actuator 182 as well as other devices and can be utilized to control the opening, partial closure, or total closure of each of the variable orifice primary exhaust port 110. In this regard, performance of the rotary engine 100 can be adjusted and or otherwise controlled. In an exemplary embodiment, changes of RPM and rotational dynamics of the piston vane 180 can be coordinated, by adjusting the amount of the primary exhaust pressure 206 and the secondary exhaust pressure 212 vented from the rotary engine 100 outer case 114. In an exemplary embodiment, changing the primary side pressure can then create a need to balance the secondary side pressure to maintain engine performance. Such a balancing of primary and secondary pressures can require coordination of the engine controller 150 and at least some of the associated interconnected components, such as the engine monitoring means 148, the exhaust port control means 162, and or other associated interconnected components, as may be required and or desired in a particular embodiment.

The cooling system means 164 can include valves, sensors, and pumping controls, and or other types and kinds of devices and systems, as may be required and or desired in a particular embodiment. In operation, a cooling system means 164 responsive to engine controller 150 can monitor the coolant liquid temperature to prevent the rotary engine 100 for overheating, which can cause damage to the engine.

The cooling system means 164 responsive to engine controller 150 can also pump or otherwise circulate the coolant liquid through the rotary engine 100. Such a pump can be a centripetal force pump formed, in part, by the drive shaft 128 having a bore hole 104, and or circulate the coolant liquid through the rotary engine 100 by way of other types and kinds of pumping methods and devices, as may be required and or desired in a particular embodiment.

FIG. 20 illustrates one example of a control system utilizing a combustive force created internal to the rotary engine 100 outer case 114 by way of an ignition source 118. In this regard, as disclosed in at least FIG. 19 an engine controller 150 can be operationally related with an operational control means 160, an engine monitoring means 148, and exhaust port control means 162, a cooling system means 164, and or other types and kinds of functional systems and methods, as may be required and or desire in a particular embodiment. In addition, FIG. 20 illustrates how an engine controller 150 can also be operationally related to a fuel means 144, a spark means 146, and a hydrogen fuel source system 152.

The fuel means 144 can include fuel pumping, filtering, mixing or carbureting, and or other types and kinds of fuel handling functions, as may be required and or desired in a particular embodiment. Such a fuel means 144 can be responsive to engine controller 150 and dispense or otherwise inject fuel into the rotary engine 100, in accordance with a firing sequence, under control of engine controller 150, by way of inlet port 116.

A fuel means 144 can be operationally related to a water injection means 178. In this regard, a water injection means can provide a small quantity of water to be injected into the rotary engine by way of an inlet port, such as inlet port 116. Once the water is inside the rotary engine 100, the engine temperature turns the water to steam, which can increase the power output of the rotary engine.

A fuel means 144 can also be operationally related to a hydrogen fuel source system 152. In an exemplary embodiment, the rotary engine 100 can be run on a hydrogen fuel source. In this regard, an aqueous solution 156 such as water, water with an electrolyte mixture, or other types and kind of aqueous solutions can be electrolyzed, by way of electrolyzer means 154, to extract a hydrogen gas. In operation, hydrogen gas can be generated through electrolysis or other similar or suitable methods, by way of electrolyzer means 154. The hydrogen gas can then be mixed or otherwise combined with other gases, such as air, by way of a fuel combining means 166. In this regard, the hydrogen gas can be mixed with air or other gases to adjust the burn intensity and or other combustive properties, as may be required and or desired in a particular embodiment. The fuel mixture from the fuel combining means 166 can then be used as a fuel source by fuel means 144 and injected into the rotary engine, as needed to operate the rotary engine 100.

A spark means 146 responsive to the engine controller 150 can combust the fuel, by way of an ignition source 118, by producing a spark. A spark means 146 can be an ignition coil, voltage multiplier, high voltage sources capable of being triggered by the engine controller 150, and or other types and kinds of spark means, as may be required and or desired in a particular embodiment. An ignition source 118 can be a spark plug, a laser, or other types and kinds of ignition sources 118, as may be required and or desired by a particular embodiment.

In an exemplary embodiment the fuel can be combusted by way of spark means 146 by producing a spark that is contained in a plasma field. An advantage of such an ignition source, in a plasma field, is a higher potential spark that can produce a more efficient combustion of the fuel. This can translate into higher rotary engine 100 performance and engine efficiency.

For purposes of disclosure combustive fuel can be a fossil fuel such as gas, petroleum gas, renewable fuel ethanol, hydrogen gas mixture, a combustive fuels source mixture with air or other types or kinds of combustive fuels or combinations thereof that can be injected through an inlet port, such as inlet port 116 and ignited by an ignition source, such as ignition source 118. Furthermore, a thrust force can be a combustive fuel source combusted external to the outer case 114 and whose force is then injected into the rotary engine 100 as a thrust force through an inlet port, such as inlet port 116. Alternatively, a thrust force can be an air pressure, other gas pressure, water pressure, or other types or kinds of thrust forces or combination thereof that can be injected through an inlet port, such as inlet port 116 that have been pressurized external to the outer case 114 and whose force is then injected into the rotary engine 100, as a thrust force through an inlet port, such as inlet port 116.

Figure 21:
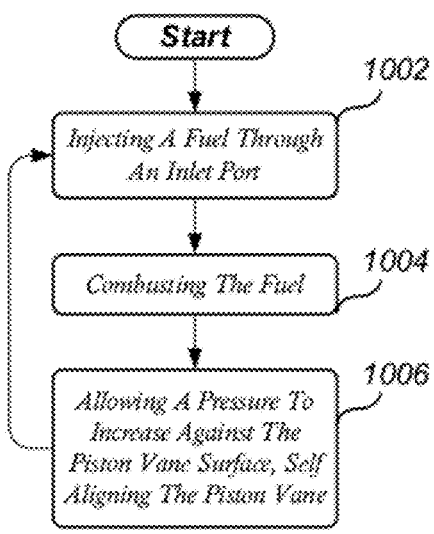
FIGS. 21-23 illustrate examples of a rotary engine method.
Figure 22:
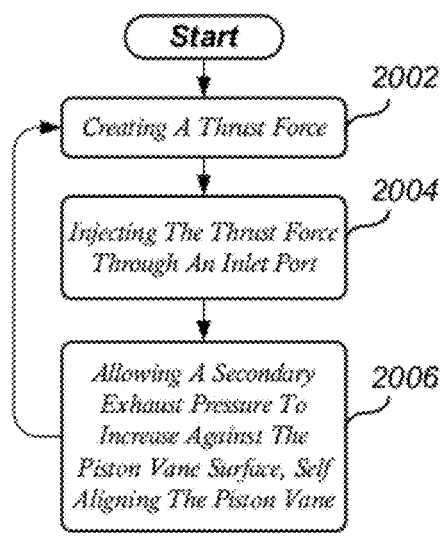

Referring to FIGS. 20-22 there is illustrated examples of a rotary engine 100 method. Referring to FIG. 21 there is illustrated one example of such a method. In an exemplary embodiment, at least one of a piston 120 can have at least one piston vane 180. At least one of a unidirectional bearing 130 can be operationally coupled to the piston 120, wherein the piston 120 is configured to allow the piston vane 180 to rotate and the unidirectional bearing 130 prevents the piston vane 180 from rotating during a combustive force or a thrust force injection. A peddle block 122 can be positioned in the pathway of the piston vane 180, wherein as the piston vane 180 approaches the peddle block 122 a secondary exhaust pressure 212 increases against the piston vane 180 rotational side 186 surface, the secondary exhaust pressure 212, in part, causes the piston vane 180 to rotate and self-align for a subsequent cycle In another exemplary embodiment, a fuel can be injected through an inlet port 116 into a volume between a piston 120 and a peddle block 122, the piston 120 having at least one piston vane 180, at least one of a unidirectional bearing 130 can be operationally coupled to the piston 120, wherein the piston 120 is configured to allow the piston vane 180 to rotate. The fuel can be combusted, wherein the unidirectional bearing 130 prevents the piston vane 180 from rotating during combustive force of the fuel. A secondary exhaust pressure increases against the piston vane 180 rotational surface 186, as the piston vane approaches the peddle block 122, the secondary exhaust pressure, in part, causes the piston vane 180 to rotate and self-align for a subsequent cycle. The cycle can then be repeated. The method begins in block 1002.

In block 1002 a fuel can be injected through an inlet port 116 into the rotary engine 100. Such a fuel can be a fossil fuel such as gas, renewable fuel ethanol, hydrogen gas mixture, a combustive fuel source mixture with air or other types or kinds of combustive fuels or combinations thereof. The method moves to block 1004.

In block 1004 the fuel can be combusted. In this regard, the force from the combusted fuel presses against the force side 184 of the piston vane 180. This in turn can cause the piston 120 to rotate away from the stationary peddle block 122. This motion can be utilized to turn a drive shaft 128. The method moves to block 1006.

In block 1006 a secondary exhaust pressure can be allowed to increase against the rotational side 186 of the piston vane, as the piston vane 180 approaches the stationary peddle bock 122. In operation, this secondary exhaust pressure can cause the piston vane 180 to rotate around the peddle block 122 and self-align for the next rotary engine 100 cycle. The method returns to block 1002.

Referring to FIG. 22 there is illustrated another example of a rotary engine 100 method. In an exemplary embodiment, a thrust force can be created external to the rotary engine 100. The thrust force can be injected through an inlet port 116 into a volume between a piston 120 having at least one piston vane 180 and a peddle block 122. At least one of a unidirectional bearing 130 can be operationally coupled to the piston 120, wherein the piston 120 can be configured to allow the piston vane 180 to rotate and the unidirectional bearing 130 prevents the piston vane 180 from rotating during injection of the thrust force. A secondary exhaust pressure 212 can be allowed to increase against the piston vane 180 rotational surface 186 as the piston vane 180 approaches the peddle block 122, the secondary exhaust pressure 212, in part, causes the piston vane 180 to rotate and self-align for a subsequent cycle. The cycle can then be repeated.

For disclosure purposes, a thrust force can be a combustive fuel source combusted external to the outer case 114 and whose force is then injected into the rotary engine 100 as a thrust force through an inlet port, such as inlet port 116. Alternatively, a thrust force can be an air pressure, other gas pressure, water pressure, or other types or kinds of thrust forces or combinations thereof that can be injected through an inlet port, such as inlet port 116 that have been pressurized external to the outer case 114 and whose force is then injected into the rotary engine 100, as a thrust force through an inlet port, such as inlet port 116. The method begins in block 2002.

In block 2002 a thrust force can be created external to the rotary engine 100 outer case 114. The method moves to block 2004.

In block 2004 the thrust force can be injected through an inlet port 116. In this regard, the force from the thrust force presses against the force side 184 of the piston vane 180. This in turn can cause the piston 120 to move away from the stationary peddle block 122. This motion can be utilized to turn a drive shaft 128. The method moves to block 2006.

In block 2006 a secondary exhaust pressure increases against the rotational side 186 of the piston vane 180, as the piston vane 180 approaches the stationary peddle bock 122. In operation, this secondary exhaust pressure can cause the piston vane 180 to rotate around the peddle block 122 and self-align for the next rotary engine 100 cycle. The method returns to block 2002.

Figure 23:
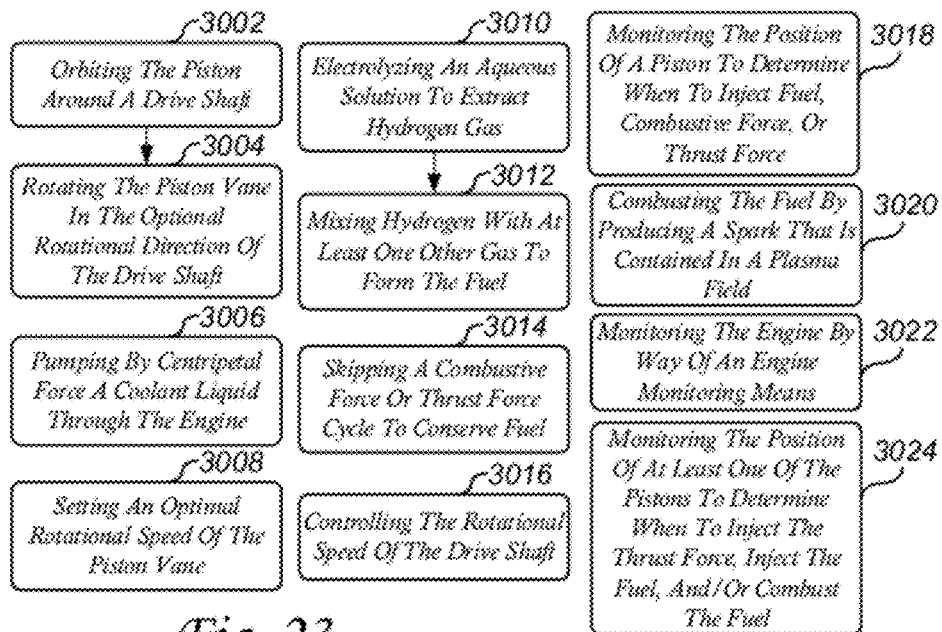

Referring to FIG. 23 there are also illustrated exemplary embodiments of a rotary engine 100 method. Such exemplary embodiments can be selectively utilized with the methods of the present invention.

In block 3002 the piston 120 can orbit around drive shaft 128. The drive shaft 128 is operationally related to the piston 120. Referring to at least FIG. 16 there is illustrated, in the rotary engine 100 timing sequence, how the piston 120 orbits the drive shaft 128. The method moves to block 3004.

In block 3004 the piston vane 180 rotates in the opposite rotational direction of the drive shaft 128, as the piston vane 180 approaches the peddle block 122. Referring to at least FIGS. 16 and 17, the Figures illustrate the directional rotation of the drive shaft 128 and the piston vane 180.

In block 3006 a coolant liquid can be pumped by centripetal force through the rotary engine 100 utilizing at least the rotation of a drive shaft 128. The drive shaft 128 is operationally related to the rotary engine 100 and forces the coolant liquid outward through at least one of a coolant distribution channel 176. This feature is illustrated in at least FIGS. 10-13.

In block 3008 an optimal rotational speed of the piston vane 180 can be set by selectively venting secondary exhaust pressure 212 from the piston vane 180, as the piston vane 180 approaches the peddle block 122. Such venting changes the pressure on the rotational side 186 of the piston vane 180 and as such changes the rotational dynamics including under and over rotation tendencies, optimal rotational speed, and other aspects of engine performance.

In block 3010 water can be electrolyzed, by way of electrolyzer means 154, to extract a hydrogen gas. In an exemplary embodiment, an aqueous solution 156 such as water or water with additives such as electrolytes, and or other type and kinds of aqueous solutions can be use to generate hydrogen through electrolysis and or other similar and or suitable methods. The method then moves to block 3012.

In block 3012 the hydrogen gas can be mixed, by way of a fuel combining means 166, with at least one other gas to form the fuel. In this regard, the hydrogen gas can be mixed with air and or other gases to adjust the burn intensity and or other combustive properties, as may be required and or desired in a particular embodiment.

In block 3014 at least one of the combustive force or thrust force cycle can be skipped to improve the fuel efficiency of the rotary engine 100. In this regard, a firing cycle can be skipped, wherein at least the fuel conserved and not expensed for at least one power portion of the cycle. The momentum of the rotary engine 100 keeps the engine running albeit at a lower performance level. The advantage is that fuel can be conserved by skipping a power portion of the cycle since no fuel is dispensed.

In block 3016 the rotational speed of the drive shaft 128 can be controlled by controlling the primary exhaust pressure 206 and secondary exhaust pressure 212. Such control can be effectuated by way of the variable orifice primary exhaust port 110, variable orifice secondary exhaust port 168, the threaded actuators 182, and or by way of other methods, as may be required and or desired in a particular embodiment.

In block 3018 the position of at least one piston 120 can be monitored to determine when to inject the thrust force. In this regard, knowing the location of the piston 120 enables the ability to know when the combustive force or thrust force needs to be effectuated to obtain the best efficiency out of the rotary engine 100.

In block 3020 the fuel can be combusted by way of spark means 146 by producing a spark that is contained in a plasma field. In this regard, the ignition source 118 can be a spark which is contained in a plasma field. An advantage with such an ignition source 118 in a plasma field is a higher energy potential spark produces a more efficient combustion of the fuel, which can translate into higher rotary engine 100 performance and efficiency. An ignition source 118 can be a spark plug, a laser, or other types and kinds of ignition source, as may be required and or desired by a particular embodiment.

In block 3022 the rotary engine 100 can be monitored by way of an engine monitoring means 148. Such an engine monitoring means 148 is operationally connected with an engine controller 150. In operation, the engine controller 150, by way of the engine monitoring means 148, can monitor, make measurements and determinations, control the rotary engine 100 functionality, as well as optimize rotary engine 100 performance and efficiency.

In block 3024 the position of at least one of the piston 120 can be monitored to determine when to inject the thrust force, fuel, and or combust the fuel. In an exemplary embodiment, knowing when to inject power by way of combustive force, thrust force, as well as to know when to inject fuel is necessary to optimize engine performance and create the most engine power with the least amount of fuel. In addition, accurate fuel injecting is required to prevent miss firings and or damage to the rotary engine 100 from occurring.

Figure 24:
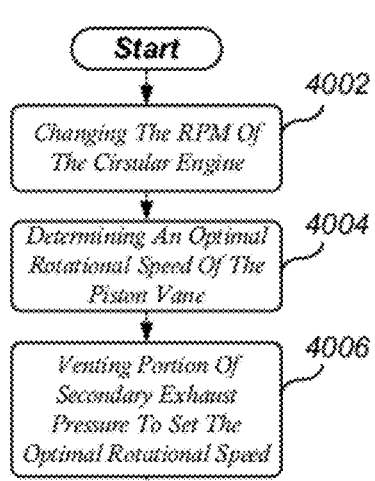
FIGS. 24-26 illustrate examples of a method of improving the performance of a rotary engine.
Figure 25:
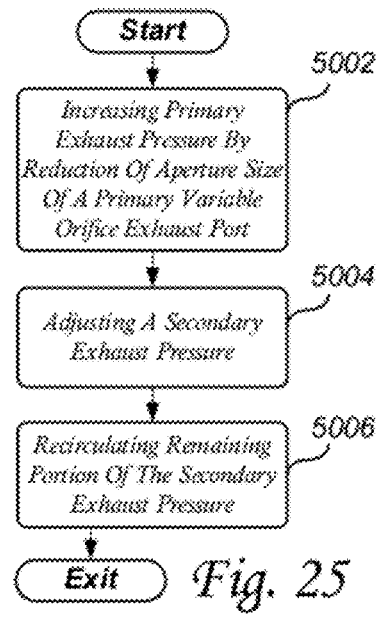

Referring to FIGS. 23-25 there is illustrated examples of a method of improving the performance of a rotary engine. In an exemplary embodiment, at least one of a piston 120 having at least one piston vane 180 can be configured to rotate. At least one of a peddle block 122 can be positioned in the pathway of the piston vane 180, wherein as the piston vane 180 approaches the peddle block 122 a secondary exhaust pressure 212 increases against the piston vane 180 rotational side 186 surface, the secondary exhaust pressure 212, in part, causes the piston vane 180 to rotate and self-align for a subsequent cycle. A variable orifice secondary exhaust port 168 selectively vents at least a portion of the secondary exhaust pressure, 212 away from the piston vane 180 setting an optimal rotational speed of the piston vane 180, improving performance of the rotary engine 100.

Referring to FIG. 24, in another exemplary embodiment, a method of improving the performance of a rotary engine can comprise changing the RPM of the rotary engine 100. An optimal rotational speed of a piston vane 180 can then be determined to minimize over and under rotation and allow the piston vane 180 to rotate around a peddle block 122. At least a portion of a secondary exhaust pressure 212 between the piston vane 180 and the peddle block 122 positioned in the pathway of the piston vane 180 can then be vented to set the optimal rotational speed of the piston vane 180. The method begins in block 4002.

In block 4002 the revolutions per minute (RPM) of the rotary engine 100 can be changed. Such a change can be initiated by way of operational control means 160, changed to improve engine performance, determined and changed by the engine controlled 150, and or changed by other means and methods, as may be required and or desired in a particular embodiment. The method moves to block 4004.

In block 4004 an optimal rotational speed of the piston vane 180 can be determined. In this regard, an optimal rotational speed for the piston vane 180 is one that does not over or under rotate as the piston vane 180 approaches the peddle block 122. Such over or under rotation can cause the piston vane 180 to hit the peddle block 122 causing engine wear and or damage to engine components including the piston vane 180 and peddle block 122. The method move to block 4006.

In block 4006 at least a portion of a secondary exhaust pressure between the piston vane 180 and the peddle block 122 positioned in the pathway of the piston vane 180 can be vented to set the optimal rotational speed of the piston vane 180. The method is exited.

Referring to FIG. 25 there is illustrated another example of a method of improving the performance of a rotary engine. In an exemplary embodiment, such a method can comprise increasing a primary exhaust pressure 206 by reduction of aperture size of at least one of a variable orifice primary exhaust port 110. A secondary exhaust pressure 212 between a piston vane 180 and a peddle block 122 positioned in the pathway of the piston vane 180 can be adjusted by change of aperture size of at least one of a variable orifice secondary exhaust port 168. The remaining portion of the secondary exhaust pressure 212 can be recirculated as the piston vane 180 rotates around the peddle block 122, wherein the rotary engine 100 RPM increases. The method begins in block 5002.

In block 5002 a primary exhaust pressure 206 is increased by reduction of aperture size of at least one of a variable orifice primary exhaust port 110. In this regard, keeping more of the primary exhaust pressure 206 inside the engine in lieu of venting increases the primary exhaust pressure 206. The method moves to block 5004.

In block 5004 a secondary exhaust pressure 212 is adjusted between a piston vane 180 and peddle block 122 positioned in the pathway of the piston vane 180 by changing the aperture size of at least one of a variable orifice secondary exhaust port 168. In this regard, by way of threaded actuators 182 and or by way of other means the aperture size of the variable orifice secondary exhaust port 168 can be changed or otherwise adjust to select the secondary exhaust pressure 212 and as such the rotational speed of the piston vane 180 based on the new increased primary exhaust pressure 206 increase. Adjusting the secondary exhaust pressure 212 can be needed when changes in the primary exhaust pressure 206 are made to insure the rotary engine 100 is operating at a maximum efficiency and that the piston vane 180 does not under or over rotate, as the piston vane 180 rotates past the peddle block 122. The method moves to block 5006.

In block 5006 the remaining portion of the secondary exhaust pressure 212 is recirculated as the piston vane 180 rotates around the peddle block 122, wherein the rotary engine 100 RPM increases. An advantage, in the present invention, of recirculating at least a portion of the secondary exhaust pressure 212 is that a turbo charging effect is effectuated. In this regard, the recirculated secondary exhaust pressure 212 increases the mass of the air entering the power producing portion of the cycle, a forced induction. The result is greater rotary engine 100 performance from an efficiency and or power perspective. The method is then exited.

Figure 26:
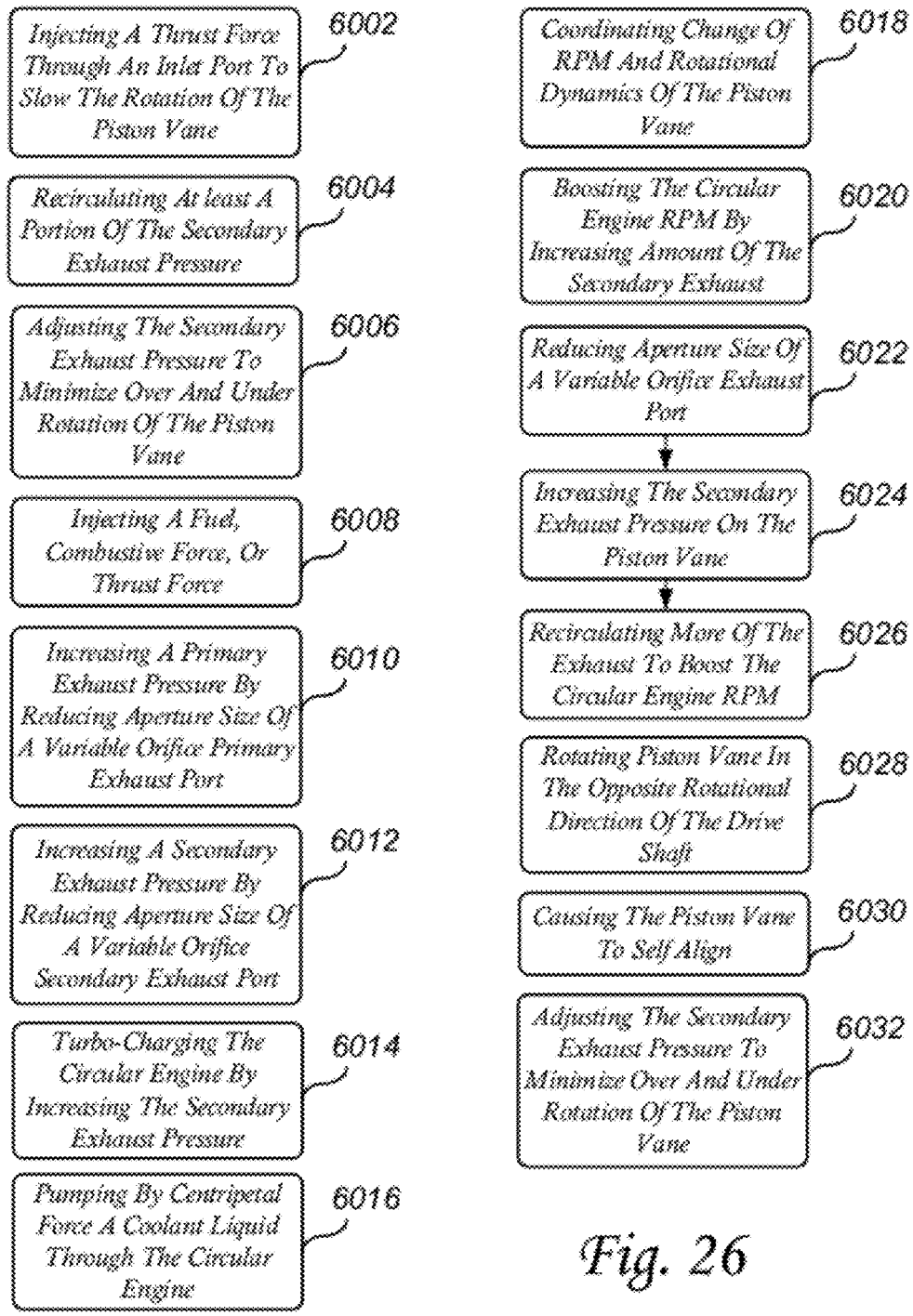

Referring to FIG. 26 there are also illustrated exemplary embodiments of a method of improving the performance of a rotary engine 100. Such exemplary embodiments can be selectively utilized with the methods of the present invention.

In block 6002 a fuel, a combustive force, or a thrust force can be injected through an inlet port 116 and or injected by way of other means to slow the rotation of the piston vane 180. Such a technique can be one method of stopping the rotation of the piston vane and can be utilized to position the piston vane 180. This method can be utilized to prevent over rotation of the piston vane 180, and or for other reasons, as may be required and or desired in a particular embodiment.

In block 6004 at least a portion of the secondary exhaust pressure 212 can be recirculated, as the piston vane 180 rotates around the peddle block 122. As a result, the rotary engine 100 RPM increases, effectively turbo-charging the rotary engine 100.

In block 6006 the secondary exhaust pressure can be adjusted to minimize over and under rotation of the piston vane 180. Such over or under rotation can cause the piston vane 180 to hit or otherwise impact the peddle block 122. To minimize the over and under rotation of the piston vane 180, an optimum rotational speed of the piston 180 vane is determined and set. The optimum rotational speed is the rotational speed which allows the piston vane 180 to rotate around, without hitting, the peddle block 122, as the piston vane 180 approaches the peddle block 122.

In block 6008 a fuel, combustive force, or thrust force can be injected by way of an inlet port 116 into the rotary engine 100. For purposes of disclosure combustive fuel can be a fossil fuel such as gas, renewable fuel ethanol, hydrogen gas mixture, a combustive fuels source mixture with air or other types or kinds of combustive fuels or combinations thereof that can be injected through an inlet port, such as inlet port 116 and ignited by an ignition source, such as ignition source 118. A thrust force can be a combustive fuel source combusted external to the outer case 114 and whose force is then injected into the rotary engine 100 as a thrust force through an inlet port, such as inlet port 116. Alternatively, a thrust force can be an air pressure, other gas pressure, water pressure, or other types or kinds of thrust forces or combination thereof that can be injected through an inlet port, such as inlet port 116 that have been pressurized external to the outer case 114 and whose force is then injected into the rotary engine 100, as a thrust force through an inlet port, such as inlet port 116.

In block 6010 a primary exhaust pressure 206 can be increased by reduction of aperture size of at least one of a variable orifice primary exhaust port 110. In operation, engine controller 150, by way of exhaust port control means 162, which can include at least one of a threaded actuator 182, can be utilized to control the opening, partial closure, or total closure of each of the variable orifice primary exhaust port 110. In this regard, performance of the rotary engine 100 can be adjusted and or otherwise controlled.

In block 6012 a primary exhaust pressure 206 can be increased by reduction of aperture size of at least one of a variable orifice primary exhaust port 110. In operation, engine controller 150 by way of exhaust port control means 162, which can include at least one of a threaded actuator 182, can be utilized to control the opening, partial closure, or total closure of each of the variable orifice secondary exhaust port 168. In this regard, performance of the rotary engine 100 can be adjusted and or otherwise controlled.

In block 6014 the rotary engine 100 can be turbo-charged by increasing the secondary exhaust pressure, increasing the piston vane 180 rotation, and or increasing the amount of secondary exhaust pressure recirculated as the piston vane 180 rotates for the next cycle. In this regard, the recirculated secondary exhaust pressure 212, at an increased pressure, increases the mass of the air entering the power producing portion of the cycle, a forced induction. The result is increased rotary engine 100 RPM and performance, from an efficiency and or power increase perspective.

In block 6016 the coolant liquid can be pumped by centripetal force through the rotary engine 100 utilizing at least the rotation of the drive shaft 128 to force the coolant liquid outward through at least one of the coolant distribution channel 176. In this regard, a centripetal force is caused by at least the rotation of the drive shaft 128 having a bore hole 104, through which coolant liquid can be delivered to the rotary engine 100.

In block 6018 coordinating change of RPM and rotational dynamics of the piston vane 180, by adjusting the amount of the primary exhaust pressure 206 and the amount of the secondary exhaust pressure 212 that is vented from the rotary engine outer case 114. In an exemplary embodiment, changing the primary side pressure can then create a need to balance the secondary side pressure to maintain engine performance. Such a balancing of primary and secondary pressures can require coordination of the engine controller 150 and at least some of the associated interconnected components, such as the engine monitoring means 148, the exhaust port control means 162, and or other associated interconnected components, as may be required and or desired in a particular embodiment.

In block 6020 the rotary engine RPM can be boosted by increasing the amount of secondary exhaust pressure 212 that is recirculated, as the piton vane 180 rotates around the peddle block 122. In this regard, the recirculated secondary exhaust pressure 212, at an increased pressure, increases the mass of the air entering the power producing portion of the cycle, a forced induction. The result is increased rotary engine 100 RPM and performance, from an efficiency and or power increase perspective.

In block 6022 the aperture size of a variable orifice primary exhaust port 110 or a variable orifice secondary exhaust port 168 can be reduced. The method moves to block 6024.

In block 6024 the secondary exhaust pressure 212 on the piston vane 180 is increased resultant from the variable orifice secondary exhaust port 168 being reduced. The method moves to block 6026.

In block 6026, as such, more of the secondary exhaust pressure 212 is recirculated to boost the rotary engine 100 RPM. In this regard, the recirculated secondary exhaust pressure 212, at an increased pressure, increases the mass of the air entering the power producing portion of the cycle, a forced induction. The result is increased rotary engine 100 RPM and performance, from an efficiency and or power increase perspective.

In block 6028 a drive shaft 128 rotates and is operationally related to the piston vane 180, the piston vane 180 rotates in the opposite rotational direction of the drive shaft 128, as the piston vane 180 approaches the peddle block 122. In an exemplary embodiment, this feature effectuates the ability of the rotary engine 100 to operate with one positive motion stroke where only a power stroke is utilized. Other aspects of a prior art multi-stroke engine such as intake, compression, and exhaust are not needed, in the present invention, as an independent cycle or stroke. The rotational direction of the piston vane 180 is in the opposite direction of the drive shaft 128 and is illustrative of how one positive motion stroke can be utilized to avoid unnecessary and or unproductive strokes.

In block 6030 the piston vane 180 can be self-aligned for the next cycle by selectively venting at least a portion of the secondary exhaust pressure 212 from the piston vane 180 to set an optimal rotational speed of the piston vane 180.

In block 6032 the secondary exhaust pressure 212 can be adjusted to minimize over and under rotation of the piston vane 180. In operation, the amount of secondary exhaust pressure 212, in part, determines the rotational speed of the piston vane 180. As such, engine controller 150 by way of the exhaust port control means 162, better illustrated in at least FIGS. 18-19, can vent an optimum amount of secondary exhaust pressure 212, as to determine and set the desired rotational speed of the piston 120. Such optimum rotational speed of the piston 120 is the rotational speed that allows the piston 120 to not over or under rotate and hit or otherwise impact the peddle block 122.

Referring to FIGS. 26-27 there is illustrated examples of a method of cooling a rotary engine 100. In an exemplary embodiment, a system for cooling a rotary engine 100 can comprise a drive shaft 128 having a bore hole 104 and at least one of a coolant transmission hole 174 in fluid communication with the bore hole 104. At least one of a coolant distribution channel 176 can be in fluid communication with the coolant transmission hole 174. A coolant fluid channel 106 receives a coolant liquid from the coolant distribution channel 176, wherein the coolant liquid is circulated between the bore hole 104 and the outer coolant fluid channel 106 to cool the rotary engine 100.

In another exemplary embodiment, a system for cooling a rotary engine 100 can comprise a drive shaft 128 having a bore hole 104 and at least one of a coolant transmission hole 174 in fluid communication with the bore hole 104. At least one coolant distribution channel 176 can be in fluid communication with the coolant transmission hole 174. At least one of an outer coolant fluid channel 106 receives a coolant liquid from the coolant distribution channel 176 and a centripetal force pump formed by at least the rotation of the drive shaft 128 circulates the coolant liquid between the bore hole 104 and the outer coolant fluid channel 106 to cool the rotary engine 100.

Referring to FIG. 27 there is illustrated another example of a method of cooling a rotary engine 100. In an exemplary embodiment, a method for cooling a rotary engine can comprise configuring a drive shaft 128 having a bore hole 104 and at least one of a coolant transmission hole 174 can be configured such that the coolant transmission hole is in fluid communication with the bore hole 104. At least one of a coolant distribution channel 176 can be aligned in fluid communication with the coolant transmission hole 174. A coolant liquid can be received from the coolant distribution channel 176 in an outer coolant fluid channel 106. The coolant liquid can be circulated between the bore hole 104 and the outer coolant fluid channel 106 to cool the rotary engine 100. The method begins in block 7002.

In block 7002 a drive shaft 128 having a bore hole 104 and at least one of a coolant transmission hole 174 can be configured such that the coolant transmission hole is in fluid communication with the bore hole 104. In an exemplary embodiment, the coolant liquid can be circulated to the rotary engine 100 through a bore hole 104 in the drive shaft 128. Such a bore hole 104 can be interconnected with a coolant transmission hole 174 such that the coolant liquid can pass from the bore hole 104 inside the drive shaft 128 to the outer surface of the drive shaft 128 by way of the coolant transmission hole 174. The method moves to block 7004.

In block 7004 at least one of a coolant distribution channel 176 can be aligned in fluid communication with the coolant transmission hole 174. In this regard, coolant liquid can be distributed throughout the rotary engine 100 by way of a series of coolant distribution channels 176. The method moves to block 7006.

In block 7006 a coolant liquid can be received, from the coolant distribution channel 176, in an outer coolant fluid channel 106. In an exemplary embodiment, the coolant fluid channel 106 is formed between the outer surface of an inner case wall 108 and the inner surface of the outer case 114. The coolant fluid channel 176 allows coolant to circulate cooling the rotary engine 100 around the outer perimeter of the channel formed between the inner case wall 108 and the inner surface of the outer case 114, among other areas. The method moves to block 7008.

In block 7008 the coolant liquid can be circulated between the bore hole 104 and the outer coolant fluid channel 106 to cool the rotary engine 100. The method is then exited.

Referring to FIG. 28 there are also illustrated exemplary embodiments of a method of cooling a rotary engine 100. Such exemplary embodiments can be selectively utilized with the methods of the present invention.

In block 8002 the coolant liquid can be pumped by centripetal force through the rotary engine 100 utilizing at least the rotation of the drive shaft 128 to force the coolant liquid outward through at least one of the coolant distribution channel 176. In this regard, a centripetal force is caused by at least the rotation of the drive shaft 128 having a bore hole 104, through which coolant liquid can be delivered to the rotary engine 100. The centripetal force pump can be utilized to circulate the coolant liquid between the bore hole 104 and the coolant fluid channel 106, by way of at least one coolant distribution channel 176 to cool the rotary engine 100.

In block 8004 the coolant distribution channel 176 can be formed integrally into a bearing plate 134, a piston race 132, and or other types and kinds of rotary engine 100 components, as may be required and or desired in a particular embodiment. An advantage can be that additional coolant tubing is not required and that the coolant liquid can pass through the components that need to be cooled easier thus creating better cooling efficiency, and or for other reasons.

In block 8006 the coolant liquid temperature can be monitored by way of a cooling system means 164. Such monitoring can prevent the rotary engine 100 from overheating, which can cause damage to the engine.

In block 8008 the coolant liquid flow rate can be adjusted based, in part, on the RPM of the drive shaft 128. In an exemplary embodiment, the faster the RPM of the rotary engine 100 the more power strokes. Each power stroke can involve a combustive force or thrust force. Such forces input heat into the rotary engine; therefore the more engine RPM the more power strokes and the more heat that needs to be removed from the rotary engine 100, by way of the cooling system. As such, the engine controller 150 and or other means can detect the change in RPM and adjust the coolant liquid flow rate accordingly to keep the rotary engine 100 at the desired temperature.

In block 8010 the coolant liquid can be circulated by way of a centripetal force pump that is formed by at least the rotation of the drive shaft 128. In this regard, a centripetal force is caused by at least the rotation of the drive shaft 128 having a bore hole 104, through which coolant liquid can be delivered to the rotary engine 100 is utilized to circulate the coolant liquid between the bore hole 104 and the coolant fluid channel 106 by way of at least one coolant distribution channel 176 to cool the rotary engine 100.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for improving the performance of a rotary engine by increasing or decreasing rotational speed of a piston vane, without contacting a peddle block located in pathway of the piston vane, the system comprising:
   at least one of a piston, the piston further comprising:
      at least two of a piston vane; and
      a piston shaft affixed to and symmetrically centered between the piston vanes;
   a piston block having an inwardly orientated semicircle relief for each of the piston;
   at least one of a unidirectional bearing is fitted around and operationally coupled to the piston shaft, the piston shaft and the unidirectional bearing cooperating to affix the piston, within the inwardly orientated semicircle relief, the unidirectional bearing allowing the piston to rotate in one direction only;
   at least one of a peddle block is positioned in the pathway of the piston vane, wherein as the piston vane approaches the peddle block an exhaust pressure increases against the piston vane surface causing the piston to rotate within the inwardly orientated semicircle relief, away from the exhaust pressure and away from the peddle block, causing the piston to self-align for a subsequent cycle; and
   a variable orifice exhaust port selectively vents at least a portion of the exhaust pressure out of the rotary engine, away from the piston vane, setting an optimal rotational speed of the piston vane, wherein the optimal rotational speed increases or decreases rotational speed of the piston vane, as the piston vane approaches the peddle block, which motivates the piston vane to rotate around the peddle block without making contact.

2. The system in accordance with claim 1, further comprising:
   at least one of a threaded actuator is adapted to vary the orifice size of the variable orifice exhaust port.

3. The system in accordance with claim 1, further comprising:
   a variable orifice primary exhaust port selectively vents at least a portion of a primary exhaust pressure, wherein change in aperture size of the variable orifice primary exhaust port causes corresponding change in aperture size of the variable orifice exhaust port.

4. The system in accordance with claim 1, further comprising:
   a drive shaft operationally related to the piston, the piston orbits the drive shaft and as the piston vane approaches the peddle block the piston vane rotates in the opposite rotational direction of the drive shaft thereby avoiding collision with the peddle block.

5. The system in accordance with claim 1, further comprising:
   a centripetal force pump, circulates a coolant liquid through the rotary engine, the centripetal force pump is formed by at least the rotation of a drive shaft having a bore hole and at least one of a coolant transmission hole in continuous fluid communication with the bore hole, the coolant transmission hole is in continuous fluid communication with at least one of a coolant distribution channel, the drive shaft is operationally related to the rotary engine, the coolant liquid is circulated by forcing the coolant liquid outward from the bore hole through the coolant distribution channel.

6. A method of improving the performance of a rotary engine by increasing or decreasing rotational speed of a piston vane, without contacting a peddle block located in pathway of the piston vane, the method comprising:
   injecting a fuel or a thrust force created external to the rotary engine through an inlet port into volume between a piston and a peddle block, the piston further comprising at least two of a piston vane and a piston shaft affixed to and symmetrically centered between the piston vanes; a piston block having an inwardly orientated semicircle relief for each of the piston; at least one of a unidirectional bearing is fitted around and operationally coupled to the piston shaft, the piston shall and the Unidirectional hearing cooperating to affix the piston, within the inwardly orientated semicircle relief, allowing the piston to rotate in one direction only;
   creating a combustive force and a primary exhaust pressure, by combusting the fuel or by way of the thrust force, wherein the unidirectional bearing prevents the piston vane from rotating away from the combustive force, the combustive force against the piston vane causing the piston block to rotate;
   changing the RPM of the rotary engine by adjusting the amount of the primary exhaust pressure vented from the rotary engine;
   determining, based on change in the primary exhaust pressure an optimal rotational speed of a piston vane, the optimal rotational speed of the piston vane is adjusted to avoid contacting the peddle block by increasing or decreasing rotational speed of the piston vane, as it approaches the peddle block, to minimize over and under rotation and allow the piston vane to rotate around the peddle block without contact, the peddle block is positioned in the pathway of the piston vane;
   venting, from the rotary engine, at least a portion of a secondary exhaust pressure from between the piston vane and the peddle block to set the optimal rotational speed of the piston vane; and
   returning to the step of injecting.

7. The method in accordance with claim 6, further comprising:
   recirculating at least a portion of the secondary exhaust pressure, as the piston vane rotates around the peddle block.

8. The method in accordance with claim 6, further comprising:
   adjusting the secondary exhaust pressure to minimize over and under rotation of the piston vane.

9. The method in accordance with claim 6, further comprising:
   coordinating change of RPM and rotational dynamics of the piston vane, by adjusting amount of the primary exhaust pressure and amount of the secondary exhaust pressure that is vented.

10. The method in accordance with claim 6, further comprising:
    boosting the rotary engine RPM by increasing amount of the secondary exhaust pressure that is recirculated as the piston vane rotates around the peddle block.

11. The method in accordance with claim 6, further comprising:
    reducing aperture size of a variable orifice primary exhaust port or a variable orifice secondary exhaust port;
    increasing the secondary exhaust pressure on the piston vane; and
    recirculating more of the secondary exhaust pressure to boost the rotary engine RPM.

12. The method in accordance with claim 6, further comprising:
injecting the fuel, the combustive force, or the thrust force through the inlet port to slow rotation of the piston vane.

13. A method for improving the performance of a rotary engine by increasing or decreasing rotational speed of a piston vane, without contacting a peddle block located in pathway of the piston vane, the method comprising:
injecting a fuel or a thrust force created external to the rotary engine through an inlet port into volume between a piston and a peddle block, the piston further comprising at least two of a piston vane and a piston shaft affixed to and symmetrically centered between the piston vanes; a piston block having an inwardly orientated semicircle relief for each of the piston; at least one of a unidirectional bearing is Fitted around and operationally coupled to the piston shaft, the piston shaft and the unidirectional bearing cooperating to affix the piston, within the inwardly orientated semicircle relief, allowing the piston to rotate in one direction only;
creating a combustive force and a primary exhaust pressure, by combusting the fuel or by way of the thrust force, wherein the unidirectional bearing prevents the piston vane from rotating away from the combustive force, the combustive force against the piston vane causing the piston block to rotate;
increasing the primary exhaust pressure by reduction of aperture size of at least one of a variable orifice primary exhaust port;
adjusting a secondary exhaust pressure between the piston vane and the peddle block positioned in the pathway of the piston vane by change of aperture size of at least one of a variable orifice secondary exhaust port;
recirculating remaining portion of the secondary exhaust pressure, as the piston vane rotates around the peddle block, wherein the rotary engine RPM increases; and
returning to the step of injecting.

14. The method in accordance with claim 13, further comprising:
increasing the secondary exhaust pressure by reduction of aperture size of at least one of a variable orifice secondary exhaust port.

15. The method in accordance with claim 13, further comprising:
rotating a drive shaft that is operationally related to the piston vane, the piston vane rotates in the opposite rotational direction of the drive shaft, as the piston vane approaches the peddle block.

16. The method in accordance with claim 13, further comprising:
causing the piston vane to self-align for the next cycle by selectively venting at least a portion of the secondary exhaust pressure to set an optimal rotational speed of the piston vane, the optimal rotational speed increases or decreases rotational speed of the piston vane, as the piston vane approaches the peddle block, motivating the piston vane to rotate around the peddle block without making contact.

17. The method in accordance with claim 13, further comprising:
turbo-charging the rotary engine by increasing the secondary exhaust pressure, increasing the piston vane rotation, and increasing the amount of secondary exhaust pressure recirculated, as the piston vane rotates for the next cycle.

18. The method in accordance with claim 13, further comprising:
pumping by centripetal force a coolant liquid through the rotary engine; and
utilizing at least the rotation of a drive shaft having a bore hole and at least one of a coolant transmission hole in continuous fluid communication with the bore hole, the coolant transmission hole is in continuous fluid communication with at least one of a coolant distribution channel, the drive shaft is operationally related to the rotary engine, the coolant liquid is circulated by forcing the coolant liquid outward from the bore hole through the coolant distribution channel.

19. The method in accordance with claim 13, further comprising:
adjusting the secondary exhaust pressure to minimize over and under rotation of the piston vane.

20. The method in accordance with claim 13, further comprising:
coordinating change of RPM and rotational dynamics of the piston vane, by adjusting amount of the primary exhaust pressure and amount of the secondary exhaust pressure that is vented.

* * * * *